United States Patent
Brakin et al.

(10) Patent No.: US 12,378,370 B2
(45) Date of Patent: Aug. 5, 2025

(54) HYDROGEL AND USES THEREOF AS A SUBSTRATE FOR GROWING PLANTS

(71) Applicant: TOMGROW LTD., Yafo (IL)

(72) Inventors: Rotem Brakin, Yafo (IL); Ofek Green, Lahav (IL); Uri Shani, Yafo (IL); Beery Kanner, Rehovot (IL)

(73) Assignee: TOMGROW LTD., Tel-Aviv (IL)

( * ) Notice: Subject to any disclaimer, the term of this patent is extended or adjusted under 35 U.S.C. 154(b) by 928 days.

(21) Appl. No.: 17/067,845

(22) Filed: Oct. 12, 2020

(65) Prior Publication Data

US 2021/0040272 A1    Feb. 11, 2021

Related U.S. Application Data

(63) Continuation-in-part of application No. 16/645,801, filed as application No. PCT/IL2018/051018 on Sep. 7, 2018, now abandoned.
(Continued)

(51) Int. Cl.
*C08K 3/22* (2006.01)
*A01G 24/35* (2018.01)
(Continued)

(52) U.S. Cl.
CPC .............. *C08J 3/075* (2013.01); *A01G 24/35* (2018.02); *C08J 3/203* (2013.01); *C08K 3/22* (2013.01);
(Continued)

(58) Field of Classification Search
CPC ........ C08J 3/075; C08J 3/203; C08J 2333/02; C08J 2335/00; A01G 24/35; C08K 3/22;
(Continued)

(56) References Cited

U.S. PATENT DOCUMENTS 2,183,970 A    12/1939  Meiss
4,036,788 A *   7/1977  Steckler ................. A61K 8/042
                                                    526/263
(Continued)

FOREIGN PATENT DOCUMENTS

CN         2596742         1/2004
CN       102754572        10/2012
(Continued)

OTHER PUBLICATIONS

Ben-Noah et al. "Review and Evaluation of Root Respiration and of Natural and Agricultural Processes of Soil Aeration", Vadose Zone Journal, 17(1): 170119-1-170119-47, Published Online Feb. 15, 2018.
(Continued)

*Primary Examiner* — Jiangtian Xu
(74) *Attorney, Agent, or Firm* — The Roy Gross Law Firm, LLC; Roy D. Gross

(57) ABSTRACT

A hydrogel includes a cross-linked polymer selected from the group consisting of polyacrylic acid, polyacrylamide and combinations thereof, the hydrogel including cross-links selected from residues of at least one difunctional acrylic material selected from the group consisting of N,N-methylene bis acrylamide (MBA), tetraethylene glycol diacrylate (TTEGDA) and combinations thereof. Further provided are methods of growing a plant using the hydrogel as a substrate.

18 Claims, 17 Drawing Sheets

Related U.S. Application Data

(60) Provisional application No. 62/556,524, filed on Sep. 11, 2017.

(51) Int. Cl.
*C08J 3/075* (2006.01)
*C08J 3/20* (2006.01)
*C08K 3/30* (2006.01)
C08L 1/28 (2006.01)
C08L 29/04 (2006.01)

(52) U.S. Cl.
CPC .............. *C08K 3/30* (2013.01); *C08J 2333/02* (2013.01); *C08J 2335/00* (2013.01); *C08K 2003/3045* (2013.01); *C08L 1/286* (2013.01); *C08L 29/04* (2013.01)

(58) Field of Classification Search
CPC .............. C08K 3/30; C08K 2003/3045; C08L 1/286; C08L 29/04
See application file for complete search history.

(56) References Cited

U.S. PATENT DOCUMENTS

| | | | |
|---|---|---|---|
| 4,236,351 A | 12/1980 | Smith | |
| 5,644,868 A | 7/1997 | Liu | |
| 5,762,480 A | 6/1998 | Adahan | |
| 5,827,743 A * | 10/1998 | Tanzawa | A01G 24/35 435/430 |
| 6,032,409 A | 3/2000 | Obonai et al. | |
| 6,226,921 B1 | 5/2001 | Kang | |
| 6,286,254 B1 | 9/2001 | Obonai et al. | |
| 6,615,539 B1 | 9/2003 | Obonai et al. | |
| 2002/0134013 A1 | 9/2002 | Obonai et al. | |
| 2003/0066234 A1 | 4/2003 | Bussey, Jr. | |
| 2005/0011120 A1 | 1/2005 | Rajagopalan | |
| 2006/0027476 A1 | 2/2006 | Scott | |
| 2007/0101644 A1 | 5/2007 | Fujimaru et al. | |
| 2009/0056219 A1 | 3/2009 | Csoke | |
| 2010/0083719 A1 | 4/2010 | Peppmoller et al. | |
| 2011/0131879 A1 | 6/2011 | Altendorfer et al. | |
| 2011/0148124 A1 | 6/2011 | Soejima | |
| 2012/0297675 A1 | 11/2012 | Hashimoto et al. | |
| 2013/0031831 A1 | 2/2013 | Orzeszyna et al. | |
| 2013/0263502 A1 * | 10/2013 | O'Shea | C08J 3/075 252/194 |
| 2014/0113821 A1 * | 4/2014 | Gu | C08L 1/286 424/405 |
| 2014/0259906 A1 | 9/2014 | Shani et al. | |
| 2015/0327440 A1 | 11/2015 | Dybro et al. | |
| 2016/0014984 A1 | 1/2016 | Ende | |
| 2017/0216817 A1 | 8/2017 | Torii et al. | |
| 2017/0359967 A1 | 12/2017 | Tetrault et al. | |
| 2018/0185820 A1 * | 7/2018 | Tada | B01J 20/3085 |
| 2018/0186042 A1 * | 7/2018 | McIntosh | B29C 48/0022 |
| 2018/0279561 A1 | 10/2018 | Kidder et al. | |
| 2019/0037785 A1 * | 2/2019 | Claessens | C08F 220/06 |

FOREIGN PATENT DOCUMENTS

| | | | |
|---|---|---|---|
| CN | 203608608 | | 5/2014 |
| CN | 104114020 | | 10/2014 |
| CN | 204069911 | | 1/2015 |
| CN | 105875030 | | 8/2016 |
| CN | 105961168 | | 9/2016 |
| CN | 105961168 A | * | 9/2016 |
| CN | 106106112 | | 11/2016 |
| EP | 0386345 | | 12/1990 |
| EP | 1145621 A1 | | 10/2021 |
| JP | H01124334 | | 5/1989 |
| JP | 2006-075055 | | 3/2006 |
| JP | 2011037515 | | 2/2011 |
| WO | 2013/158306 A1 | | 10/2013 |
| WO | 2016089742 | | 6/2016 |
| WO | 2016090330 | | 6/2016 |
| WO | 2017134171 | | 8/2017 |
| WO | 2019049156 | | 3/2019 |

OTHER PUBLICATIONS

Gong "Why Are Double Network Hydrogels so Tough?", Soft Matter, 6(12): 2583-2590, Advance Publication Mar. 9, 2010.

Kovacic et al. "Hydrogels Through Emulsion Templating: Sequential Polymerization and Double Networks", Polymer Chemistry, 8(40): 6319-6328, Published Online Sep. 22, 2017.

Liu et al. "Tough and Highly Stretchable Graphene Oxide/Polyacrylamide Nanocomposite Hydrogels", Journal of Materials Chemistry, 22(28): 14160-14167, Published Online May 21, 2012.

McKeown et al. "Polymers With Inherent Microporosity", Porous Polymers, Section I: Synthesis, Chap.I: 3-29, Published Online Jan. 25, 2011.

Zhong et al. "Self-Healable, Though and Highly Stretchable Ionic Nanocomposite Physical Hydrogels", Soft Matter, 11(21): 4235-4241, Jun. 7, 2015.

Search Report in Singapore patent application 11202001982T, dated Feb. 11, 2021.

Written opinion in Singapore patent application 11202001982T, dated Feb. 11, 2021.

* cited by examiner

HYDROGEL AND USES THEREOF AS A SUBSTRATE FOR GROWING PLANTS

CROSS-REFERENCE TO RELATED APPLICATIONS

This patent application is a Continuation-in-Part (CIP) of U.S. Ser. No. 16/645,801, filed on Mar. 10, 2020, which is hereby incorporated by reference in its entirety. The above-mentioned U.S. Ser. No. 16/645,801 is a National Stage of PCT international application number PCT/IL2018/051018, having an international filing date of Sep. 7, 2018, published as international publication number WO 2019/049156 A1, which is hereby incorporated by reference in its entirety; which claims benefit and priority from U.S. 62/556,524, filed on Sep. 11, 2017, which is hereby incorporated by reference in its entirety.

FIELD AND BACKGROUND

The present invention, in some embodiments thereof, relates to plant growing and more particularly, but not exclusively, to a plant growing container and a method for encouraging plant growth in a container.

The present invention, in some embodiments thereof, relates to plant growing and more particularly, but not exclusively, to a hydrogel and uses thereof as a substrate for growing a plant. Potted plants are commonly used for decor in both indoor and outdoor environments. Potting soil, typically used in known plant growing containers may contain little or no field soil but are instead composed of a variety of organic and inorganic materials and are referred to as soilless mixes. The mixes provide for selectively controlling the environment surrounding the plant and encouraging plant growth.

One of the challenges associated with potted plants is the constant watering required to maintain the plant. The market offers various products geared toward alleviating this challenge.

Self watering containers are known. A self watering container typically includes an inner pot that holds a plant and soil, and an outer pot or reservoir that holds water. A wick joins the two and pulls water up into the root ball. A drawback of this product may be associated with the overall size of the container that may be required to be large to significantly reduce the frequency of the watering. U.S. Pat. No. 6,226,921 entitled "Self-watering planter," the content of which is fully incorporated herein by reference, describes a plant watering device for use in conjunction with a planting container. The device has an enclosed water reservoir at the lower portion of the planter and a water fill tube communicating with the water reservoir extending to the area of the planter rim. A water level indicating mechanism is provided to communicate the water reservoir level of the planter to the user in order to determine the level of water in the reservoir. The water level indicator comprises a float in the water reservoir having a stem extending upwardly through a hollow tube to indicate the water level. Capillary wicking material is provided to wick water from the water reservoir to planting media within the planter. It is described that the wicking material may be formed from a geotextile.

Geotextiles formed from polypropylene or polyester materials are known to be used in association with soil. Geotextile may come in three basic forms: woven (resembling mail bag sacking), needle punched (resembling felt), or heat bonded (resembling ironed felt). It is known for example to construct a plant pot with a non-woven geotextile. The geotextile material in this case allows for free passage of air and water through the sidewall(s) that can aid fibrous root development of the plant.

It is also known to use hydrogel beads as an alternative or an additive to conventional potting soil for growing a potted plant. Hydrogel is a hydrophilic cross-linked polymer that forms three-dimensional molecular networks which can absorb and hold large amounts of water. Hydrogel can absorb water and nutrients and also release them back to the potting soil when the plant demands it. The addition of hydrogel in a potted plant may decrease the required watering frequency.

Linear polymers such as polysaccharides and polyacrylates are also used for soil improvement and water reservation. Examples of such commercially available materials include Natrosol™ 250HHX, Klucel™ L IND, Blanose™ CMC 7H5SCF, Agrimer™ ATF, Agrimer™ AT and Aqualon™ CMC 7H, marketed by Ashland.

European Patent Application Publication No. EP 0386345, entitled "A method for forming a mixture of soil conditioning means," the content of which is fully incorporated herein by reference, describes a method for forming a mixture of soil conditioning means for improving plant growth. The mixture is disclosed to include a water absorbing polymer. The water and/or air capacity of the part of the soil to be conditioned provides a first indicator which serves to determine the total amount of polymer necessary to form the mixture of soil conditioning means.

Japanese Patent Application Publication No. JP2006075055, entitled "Water-holding material for growing plant, consisting mainly of water-absorbing resin," the content of which is fully incorporated herein by reference, describes a granular water-absorbing material containing a water-absorbing resin and a composite inorganic compound. The content of the composite inorganic compound is 5-50 mass % based on the solid portion of the water-absorbing resin. The composite inorganic compound has between 0-10 g solubility to 100 g of ion-exchanging water at 20° C., and contains calcium, magnesium, iron and/or silicon. It is described that material provides improved water-holding capability with a quick water-absorbing speed.

SUMMARY

According to an aspect of some embodiments of the present disclosure there is provided a plant growing container comprising a housing having therein growing medium that includes layers of hydrogel separated by thin layers of spacing material, as well as an improved method for growing plants in the container. Optionally and preferably the growing medium is soilless.

In some example embodiments, the container includes one or more elements in addition to the growing media that are configured to improve root aeration and growth. Optionally, the container includes one or more air channels that are penetrated across the layers of hydrogel and spacing material and the air channels are configured to boost aeration of the roots. In some example embodiments, the container includes a liner that lines an inner portion of the housing and is configured to provide water transport from the bottom of the container toward the upper part of the container. The free water movement provided by the liner may boost the rate of water absorption of the roots in the container. In some additional example embodiments, the container includes tubing dedicated to providing water movement from the bottom of the container toward the top of the container in place of the lining and/or in addition to the lining.

In some example embodiments, the container and the method provide for reducing the toil associated with maintaining a plant by significantly reducing the required frequency for watering the plants. According to some example embodiments, the container is configured to have a large capacity for holding water and the water is configured to be distributed in a substantially uniform manner throughout the container.

In some example embodiments, the container and the method provide for eliminating the potential mess typically associated with plants potted in soil. In some example embodiments, the container is sealed at the bottom and does not require drainage. The need for a drain in conventional plant containers may be a deterrent for using potted plants indoors. The drain may at times overflow and may also expel soil. The expelled water and soil may potentially damage or soil furniture, carpeting and flooring. By eliminating the need for drainage, the container may be better suited for indoor environments.

According to aspects of some example embodiments, there is provided a plant growing container comprising: a housing comprising side walls defining a cavity and configured for receiving a plant; at least two layers of hydrogel separated by at least one layer of spacing material, wherein the at least two layers of hydrogel and the at least one layer of spacing material is in the cavity of the housing; and an elongated element penetrating across the at least two layers of hydrogel and across the at least one layer of spacing material, wherein the elongated element is configured as an air channel that transports air from outside the cavity inwards.

Optionally, the layer of spacing material is a layer of fabric.

Optionally, the layer of spacing material is a layer of geotextile.

Optionally, the spacing material is formed from at least one of peat moss, perlite, vermiculite, coconut coir, and a synthetic polymer, and any combination thereof.

Optionally, the spacing material is an integral part of the housing.

Optionally, the elongated element is a tube that is perforated along its length.

Optionally, the elongated element is formed from strands of one or more of fabric, clay, ceramic material, perlite, hydrophobic sand and synthetic polymer, e.g. Gortex™.

Optionally, the elongated element is integral to the housing.

Optionally, each of the at least two layers of hydrogel is between 0.5 to 10 cm thick while fully hydrated.

Optionally, the at least one layer of spacing material is configured to be between 1 mm to 5 cm.

Optionally, the at least one layer of spacing material is configured to 0.01 to 0.5 times the thickness of the at least two layers of hydrogel.

Optionally, the container includes a lining, wherein the lining lines the walls of the housing facing the cavity.

Optionally, the lining additionally lines a floor of the housing.

Optionally, the lining is formed from a porous material that is configured to transport water from a bottom of the housing toward an upper portion of the housing by capillary motion.

Optionally, the container includes NAFION® tubing, wherein the NAFION® is configured to extend from an upper portion of the housing toward a bottom of the housing.

Optionally, the container includes a sensor configured to sense a level of hydration in the housing.

Optionally, the container includes a sensor configured to sense a parameter that characterizes the plant.

In some of any of the embodiments described herein, the hydrogel is as described herein in any of the respective embodiments.

According to aspects of some example embodiments, there is provided a method for building a container for growing plants, the method comprising: adding a first layer of hydrogel within a cavity defined by a housing comprising side walls; adding a layer of spacing material within the cavity and over the first layer of hydrogel; adding a second layer of hydrogel over the layer of spacing material; and penetrating an elongated element through the second layer of hydrogel, the layer of spacing material and the first layer of hydrogel.

Optionally, the method includes lining the walls of the housing facing the cavity with fabric prior to adding the first layer of hydrogel.

Optionally, the fabric is configured with holes that are sized to transport water from a bottom of the housing toward an upper portion of the housing by capillary motion.

Optionally, the at least one layer of spacing material is configured to 0.01 to 0.5 times the thickness of the at least two layers of hydrogel.

Optionally, the spacing material is formed from at least one of peat moss, perlite, vermiculite, coconut coir, geotextile, and a synthetic polymer.

Optionally, the method includes placing a plant within the cavity and on the layer of spacing material and adding the second layer of hydrogel around the plant.

According to aspects of some example embodiments, there is provided a kit for growing a plant in a plant growing container comprising: hydrogel (as described herein in any of the respective embodiments); a sheet of porous material; and at least one staff including pores configured for air flow.

Optionally, the kit includes a first sensor configured to sense a level of hydration of the hydrogel.

Optionally, the kit includes a second sensor configured to sense a parameter characterizing the plant such as for example stem thickness.

Optionally, the kit includes NAFION® tubing.

Optionally, the kit includes a lamp configured to promote photosynthesis.

Optionally, the kit includes a dose of a fertilizing agent.

Optionally, the kit includes a plant pot.

Optionally, the hydrogel, the sheet of porous material; and the at least one staff are pre-assembled in a plant growing container.

Optionally, the kit includes instructions on how to assemble the plant growing container with contents of the kit.

Optionally, the kit includes instructions on how to plant a plant in the plant growing container.

According to an aspect of some embodiments of the present disclosure there is provided a hydrogel and uses thereof as a substrate for growing a plant.

In some embodiments, the plant is grown in a container containing the hydrogel. In some such embodiments, the plant is grown in the container using the hydrogel as a sole substrate, in the absence of any additional horizontal layers and/or in the absence of any vertical elements such as vertical elements for providing air channels.

In some embodiments, the hydrogel is used alone as a sole substrate, in the absence of soil.

According to an aspect of some embodiment of the present invention, there is provided a hydrogel comprising a cross-linked polymer selected from the group consisting of polyacrylic acid, polyacrylamide and combinations thereof, the hydrogel comprising cross-links selected from residues of at least one difunctional acrylic material selected from the group consisting of N,N-methylene bis acrylamide (MBA), tetraethylene glycol diacrylate (TTEGDA) and combinations thereof.

In some embodiments, the difunctional acrylic material comprises a mixture of MBA and TTEDGA. In some such embodiments, a ratio of MBA to TTEGDA is in the range of from about 10:1 to about 1:10.

In some embodiments, the hydrogel further comprises a non-crosslinked additive. In some such embodiments, the non-crosslinked additive is a macromolecule selected from the group consisting of polycaprolactone, polyvinylalcohol (PVA), polysaccharides and combinations thereof. In some such embodiments, the non-crosslinked additive is selected from the group consisting of PVA, CMC and combinations thereof. In some embodiments, the polysaccharide is selected from the group consisting of dextran, alginate, agarose, chitosan, hyaluronic acid, starch, hydroxypropyl cellulose (HPC), carboxymethyl cellulose (CMC), k-carrageenan, i-carrageenan). In some embodiments, the polysaccharide is selected from the group consisting of alginate methacrylate, sodium salt of alginic acid, glycol chitosan methacrylate, hyaluronic acid methacrylate, glycol chitosan methacrylate, and combinations thereof.

In some embodiments, the hydrogel further comprises an acid neutralizer comprising sodium hydroxide (NaOH).

In some embodiments, the cross-linked polymer further comprises hydroxy ethyl acrylate (HEA) monomer residues.

In some embodiments, the hydrogel further comprises a polymerization initiator, such as, sodium persulfate (SPS).

In some embodiments, the hydrogel comprises polyacrylic acid, a mixture of MBA and TTEGDA, NaOH, HEA, CMC and SPS.

In some embodiments, the degree of crosslinking of the hydrogel is from about 0.04 to about 0.4. According to an aspect of some embodiments of the present invention, there is provided a method for the preparation of a hydrogel, the method comprising combining the following components in water to provide an aqueous hydrogel precursor solution i) CMC; ii) acrylic acid; iii) HEA; iv) NaOH; v) MBA and TTEGDA; and vi) SPS, and heating the hydrogel precursor solution whereby polymerization and crosslinking of said acrylic acid occurs to provide said hydrogel. According to a preferred embodiment, the components are added in the order as listed. According to some such embodiments, the CMC is provided as a first aqueous solution, the acrylic acid is provided as a second aqueous solution, wherein the method comprises mixing the first aqueous solution and said second aqueous solution to form a third aqueous solution; and adding the following components to the third aqueous solution to provide the hydrogel precursor solution: HEA; NaOH; MBA and TTEGDA; and SPS. According to a preferred embodiment, the components are added in the order as listed.

According to an aspect of some embodiments of the present invention, there is provided a method for growing a plant, the method comprising providing a hydrogel as disclosed herein as a growth medium; placing a plant in the growth medium in the absence of soil; and allowing the plant to grow in the growth medium in the absence of soil.

As used herein, the term "plant" is intended to encompass an entire plant or parts thereof, such as seeds thereof.

In some embodiments, the hydrogel as disclosed herein comprises polyacrylic acid, cross-links selected from residues of at least one difunctional acrylic material selected from the group consisting of N,N-methylene bis acrylamide (MBA), tetraethylene glycol diacrylate (TTEGDA) and combinations thereof, and further comprises KOH as an acid neutralizer.

In some embodiments, the hydrogel as disclosed herein comprises CMC as a non-crosslinked additive, wherein the CMC has a molecular weight in the range of from 90 kDa to 1,000 kDa.

In some embodiments, the hydrogel as disclosed herein comprises a polymerization initiator comprising a light initiator. In some such embodiments, the light initiator is selected from the group consisting of 2,2-Dimethoxy-2-phenylacetophenone, lithium phenyl-2,4,6-trimethylbenzoylphosphinate, an Igracure® photoinitiator (such as 2-Hydroxy-4'-(2-hydroxyethoxy)-2-methylpropiophenone, Igracure® 2599; bis(2,4,6-trimethylbenzoyl)-phenylphosphineoxide, Igracure 819@; ,2-Dimethoxy-1,2-diphenylethan-1-one, Igracure® 651; (2-Benzyl-2-(dimethylamino)-1-[4-(morpholinyl) phenyl)]-1-butanone), Igracure® 369; or 1-Hydroxycyclohexyl phenyl ketone, Igracure® 184) and combinations thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SOME DEMONSTRATIVE EMBODIMENTS OF THE PRESENT INVENTION

Figure 1A:
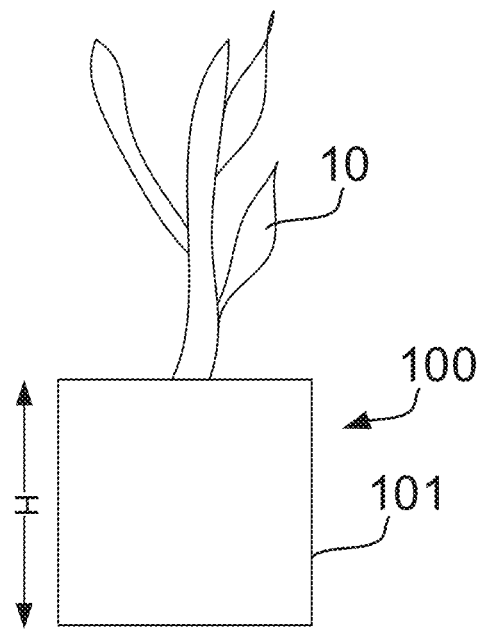
FIGS. 1A and 1B is a simplified schematic drawing and cross-sectional cut of a plant growing container with a plant in accordance with some embodiments of the present disclosure.

The present invention, in some embodiments thereof, relates to plant growing and more particularly, but not exclusively, to a plant growing container and a method for encouraging plant growth in a container.

One deterrent for growing potted plants is the maintenance required and the short lifespan of the plants when the maintenance is not performed properly. Another deterrent for indoor environments is the need for a drain to collect access water applied during watering. One solution may be to use hydrogel in place of conventional potting soil. The hydrogel may absorb a large amount of water and supply that water to the roots over an extended period of time and in a controlled manner. However, it was found by the present inventors that the use of hydrogel as a sole growing medium may have a number of drawbacks. One drawback is that a rate of oxygen diffusion through the hydrogel may be slow and may not be adequate for properly aerating the roots. A lack of oxygen may potentially stunt root growth. Another drawback is that the hydrogel provides water to the roots by diffusion which is typically slow and inefficient. Since the hydrogel typically absorbs all the water in the container, there is no water transport in mass movement. Furthermore, when watering the container, the water seeps downwards and swells the hydrogel beads at the bottom of the container more than the hydrogel beads in the upper or middle portion of the container which have higher root density than the bottom.

It was found by the present inventors that due to the inefficiency of water movement by diffusion, only roots that are close to the hydrogel that are swelled may be adequately hydrated. Although it is known to mix hydrogel beads with additional growing medium to alleviate some of these drawbacks, the mixed medium significantly reduces the volume of the hydrogel. When the volume occupied by the hydrogel is reduced, the amount of water that can be stored in the container is also reduced and the benefit of significantly reducing the watering frequency may be lost.

According to some example embodiments there is provided a plant growing container that includes an improved growing medium and environment for plant growth. The growing medium includes hydrogel that optionally and preferably occupies the majority of the volume in the container. According to some example embodiments, the hydrogel is arranged in horizontal layers separated by thin layers of spacing material. Optionally, the thin layers of spacing material provide growing paths to support root growth. The spacing material may provide a porous layer through which air can penetrate. In some example embodiments, the spacing material is formed from peat moss, perlite, vermiculite, coconut coir, and/or fabric (woven or non-woven). The spacing material may optionally be formed from a polymer, e.g. a synthetic polymer, and may even be an integral part of the container. In some example embodiments, the hydrogel layer may be a mix of hydrogel with soil. The ratio of soil to hydrogel may be for is less than 0.4 (soil/hydrogel), less than 0.3, less than 0.2, or less than 0.1.

Thickness of a hydrogel layer may range between 0.5 cm to 10 cm depending on the size of the container and while thickness of the spacing material may range between 1 mm and 5 cm. Optionally, the hydrogel layer is formed from a hydrogel that is based on acrylic acid.

Herein and in the art, the term "hydrogel" describes a three-dimensional fibrous network containing at least 20%, typically at least 50%, or at least 80%, at least 90%, at least 95%, at least 98%, at least 99%, and up to about 99.99% (by weight) water. A hydrogel can be regarded as a material which is mostly water, yet behaves like a solid or semi-solid due to a three-dimensional crosslinked solid-like network, made of natural and/or synthetic polymeric chains, within the liquid dispersing medium.

According to some embodiments of the present invention, the hydrogel contains at least 90%, by weight, water, and according to some embodiments, the hydrogel is capable of releasing to an environment at least 20%, or at least 30%, or at least 40%, or at least 50%, preferably at least 60%, or at least 70%, or at least 80%, more preferably at least 90%, at least 95%, at least 98 5, at least 99%, or all, of the water contained therein.

According to some embodiments of the present invention, the hydrogel is capable of releasing the water contained therein, as described herein, to an environment when exposed to conditions that promote the water release from the hydrogel. Such conditions include, for example, conditions that promote water evaporation, and/or water uptake by a plant (e.g., plant's root).

According to some embodiments of the present invention, a hydrogel may contain polymeric chains of various lengths and chemical compositions, depending on the precursors used for preparing it. The polymeric chains can be made of monomers, oligomers, block-polymeric units, which are inter-connected (crosslinked) by chemical bonds (covalent, hydrogen and ionic/complex/metallic bonds, typically covalent bonds). The network-forming material comprises either small aggregating molecules, particles, or polymers that form extended elongated structures with interconnections (the crosslinks) between the segments. The crosslinks can be in the form of covalent bonds, coordinative, electrostatic, hydrophobic, or dipole-dipole interactions or chain entanglements between the network segments. In the context of the present embodiments, the polymeric chains are preferably amphiphilic or hydrophilic in nature.

The hydrogel, according to embodiments of the present invention, is a synthetically prepared hydrogel, although hydrogels of a biological origin (naturally occurring hydrogels or hydrogels formed of naturally occurring hydrogel-forming materials) are also contemplated.

Exemplary polymers or co-polymers usable for forming the hydrogel according to the present embodiments include polyacrylates, polymethacrylates, polyacrylamides, polymethacrylamides, polyvinylpyrrolidone, polyvinyl caprolactam and copolymers of any of the foregoing. Other examples include polyethers, polyurethanes, polysaccharides and poly(ethylene glycol)s, functionalized by cross-linking groups or usable in combination with compatible cross linking agents.

Some specific, non-limiting examples, include: poly (acrylic acid), poly(2-vinylpiridine), poly(methacrylic acid), poly(N-isopropylacrylamide), poly(N,N'-methylenbisacrylamide), poly(N—(N-propyl)acrylamide), poly(methacrylic acid), poly(2-hydroxyacrylamide), poly(ethylene glycol) acrylate, poly(ethylene glycol)methacrylate, poly(2-acrylamido-2-methylpropanesulfonic acid).

Monomeric precursors forming such polymeric chains are recognized by those skilled in the art, and all are contemplated, including any combination thereof.

In some embodiments, the hydrogel comprises poly (acrylic acid) and/or poly(acrylamide), formed of an acrylic acid, acrylamide or a mixture thereof.

Hydrogels are typically formed of, or are formed in the presence of, di- or tri- or multi-functional monomers, oligomer or polymers, which are collectively referred to as hydrogel-forming agents, or crosslinking agents, having two, three or more polymerizable groups. The presence of more than one polymerizable group renders such precursors crosslinkable, and allow the formation of the three-dimensional network.

Exemplary crosslinkable monomers include, without limitation, the family of di- and tri-acrylates monomers, which have two or three polymerizable functionalities, Exemplary diacrylates monomers include, without limitation, methylene diacrylate, N,N-methylene bis(acrylamide), the family of poly(ethylene glycol)$_n$ (n=2-20) diacrylates (nEGDA), including di-, tri-, tetra-, penta-, hexa-, and so forth ethylene glycol diacrylate, and the family of poly (ethylene glycol)$_n$ (n=2-20) dimethacrylate (nEGDMA).

Exemplary triacrylates monomers include, without limitation, trimethylolpropane triacrylate, pentaerythritol triacrylate, tris(2-hydroxy ethyl) isocyanurate triacrylate, isocyanuric acid tris(2-acryloyloxyethyl) ester, ethoxylated trimethylolpropane triacrylate, pentaerythrityl triacrylate and glycerol triacrylate, phosphinylidynetris(oxyethylene) triacrylate.

Hydrogels may take a physical form that ranges from soft, brittle and weak to hard, elastic and tough material. Soft hydrogels may be characterized by rheological parameters including elastic and viscoelastic parameters, while hard hydrogels are suitably characterized by tensile strength parameters, elastic modulus or stiffness, storage and loss moduli, and toughness (defined as an integral beneath a stress-strain curve of the material) as these terms are known in the art.

A hydrogel, according to some embodiments of the present invention, may contain macromolecular polymeric and/or fibrous elements which are not chemically connected to the main crosslinked network but are rather mechanically intertwined therewith (e.g., as intertwined polymeric network) and/or immersed therein. Such macromolecular fibrous elements can be woven (as in, for example, a mesh structure), or non-woven, and can, in some embodiments, serve as reinforcing materials of the hydrogel's fibrous network and/or for manipulating the microstructure of the hydrogel, for example, the porosity of the hydrogel. Non-limiting examples of such macromolecules include polycaprolactone, polyvinylalcohol, polysaccharides such as dextran, alginate, agarose, chitosan, hyaluronic acid, starch, hydroxypropyl cellulose (HPC), carboxymethyl cellulose (CMC), k-carrageenan, i-carrageenan, other non-crosslinked natural or synthetic polymeric chains and the like, and any co-polymer of the foregoing.

According to some of any of the embodiment of the present invention, the amount of such non-crosslinked additives ranges from 0.1 to 10 weight percents of the hydrogel precursor solution.

The hydrogel can alternatively or in addition further include polymeric materials that form a part of the hydrogel's 3D network and which impart to the hydrogel chemical properties such as, for example, increasing hydrophilic or amphiphilic nature. Exemplary such materials include polysaccharides featuring polymerizable and/or crosslinkable groups such as, but not limited to, alginate methacrylate, glycol chitosan methacrylate, hyaluronic acid methacrylate, glycol chitosan methacrylate, and the like.

The chemical composition of the polymer chains, the "degree of crosslinking" (number of interconnected links between the chains), and the aqueous media content and composition (e.g., an inclusion of macromolecules and/or other additives therein) may also affect the capability of the hydrogel to release the water contained therein and the extent of released water.

In addition, mechanical properties such as, for example, brittleness, may affect the release of water from the hydrogel, such that, for example, brittle hydrogels may release water uncontrollably under pressure. It is also desirable to use hydrogels which feature sufficient toughness and/or compression modulus.

The stiffness and/or toughness of a hydrogel is governed inter alia by the microstructure of the hydrogel, the chemical composition of the polymer chains, the "degree of cross-linking" (number of interconnected links between the chains), the aqueous media content and composition, and/or temperature.

In some embodiments, the hydrogel is characterized by one or more of the following mechanical properties (when measured using acceptable standard procedures as known in the art): Elastic modulus of at least 0.1 MPa, for example, in a range of from 0.1 to 1.0 MPa; Failure tensile stress of at least 1 MPa, for example, in a range of from 1 to 30 MPa, in the strain of from 1000 to 2000%.

Failure compressive stress of at least 20 MPa, for example, in a range of from 20 to 60 MPa, in the strain of from 90 to 95%.

Toughness (tearing fracture energy) of at least 100, for example, in a range of from 100 to 1000 J m-2.

Hydrogels should desirably feature, in addition to water absorption and release capabilities, also root penetration, that is—enabling penetration of the plant's roots thereto, for a successful plant growth. See, for example, Mebiol's technology at wwwdotmebioldotcodotjp/en/product/. Root penetration is also affected by factors such as the microstructure of the hydrogel, the chemical composition of the polymer chains, the "degree of crosslinking", and the aqueous media content and composition.

Hydrogels which enable root penetration are typically porous and are formed of monomers or mixture of monomers that may promote good interaction with the roots. Such hydrogels typically feature a hydrophilic nature by, for example, featuring groups such as carboxylic acid, hydroxy, and other hydrophilic groups.

In some of any of the embodiments described herein, the hydrogel features a porous structure, that is, it is characterized by a surface area as measured in BET measurements in a range of from 300 to 2000 $m^2$/gram and/or by features characterizing highly porous polymeric materials as described, for example, in N. B. Mckeown and P. M. Budd, "Polymers with Inherent Microporosity," Porous Polym., pp. 1-29, 2011.

High porosity of the hydrogel contributes to the water absorption capacity and water availability to plants and further to the root penetration.

A porous structure of the hydrogel enhances water capacity, held by capillary forces. Water molecules held by capillary forces inside the pores are much more available than hydrogen-bonded water molecules.

In some embodiments, an average size of the pores in a porous hydrogel is at least 30 μm, according to a capillary pressure of 100 mbar, which is the standard pressure for available water uptake by roots as shown herein.

Hydrogels featuring desired mechanical properties and/or microstructure (e.g., porosity) are obtainable using materials and/or methods known in the art, as described in the following, non-limiting examples: Slide-ring & Tetra-PEG hydrogels; Nano-composite hydrogels with surface modifiers (clay, silica, graphene-oxide, etc.); Double-network (DN) hydrogels; Hydrophobic modified hydrogels; Ionically cross-linked hydrogels; Macromolecular microsphere composite (MMC) hydrogels; and Dipole-dipole and hydrogen bonding reinforced hydrogels. See, for example, Zhong et al., Soft Matter, Vol. 11, No. 21, pp. 4235-4241, 2015.

Nano-composite hydrogels which exhibit enhanced mechanical properties include, for example, graphene oxide/polyacrylamide hydrogels as described in Liu et al., J. Mater. Chem., Vol. 22, No. 28, pp. 14160-14167, 2012; Double network (DN) hydrogels such as described in J. P. Gong, Soft Matter, Vol. 6, No. 12, pp. 2583-2590, 2010, or PAMPS/PAAm hydrogel synthesized through HIPE reaction such as described in S. Kovačič & M. S. Silverstein, Polym. Chem., Vol. 8, No. 40, pp. 6319-6328, 2017.

According to some of the present embodiments, the hydrogel comprises polymeric chains, formed of monomeric precursors or a mixture of such precursors, as described herein, crosslinked by a difunctional hydrogel forming agent or a mixture of such agents, as described herein.

In some embodiments, a weight ratio of the monomeric precursors and the difunctional hydrogel forming agent ranges from 50:1 to 5:1, or from 20:1 to 5:1, or from 15:1 to 5:1. In some embodiments this ratio is about 10:1. In some embodiments, this ratio is about 20:1. In some embodiments this ratio is about 5:1.

In some of any of the embodiments described herein, the hydrogel is made of a polyacrylate (using monomeric precursors that comprise acrylic acid and/or an acrylic ester), or of a mixture of a polyacrylate and a polyacrylamide, crosslinked by a hydrogel forming agent that comprises a difunctional acrylic material or mixture of acrylic materials (that is, one or more of diacrylate, dimethacrylate, bis(acrylamide), bis(methacrylamide).

In some of any of the embodiments described herein, the hydrogel is made of a mixture of a polyacrylate and a polyacrylamide, crosslinked by a hydrogel forming agent that comprises a difunctional acrylic material or mixture of acrylic materials (that is, one or more of diacrylate, dimethacrylate, bis(acrylamide), bis(methacrylamide). A weight ratio of the acrylic acid and the acrylamide in the hydrogel precursor solution may range from about 10:1 to 1:10, or from 5:1 to 1:10, or from 1:1 to 1:10, or from 1:1 to 1:5, and can be, for example, about 1:2, or about 1:3 or about 1:4.

In some embodiments, the difunctional acrylic material(s) comprise a bis(acrylamide), for example, N.N-methylene bis(acrylamide).

In some embodiments, the difunctional acrylic material(s) comprise a poly(ethylene glycol)$_n$ (n=2-20) diacrylate (nEGDA), for example, a tetra(ethylene glycol) diacrylate.

In some embodiments, the difunctional acrylic material(s) comprise a bis(acrylamide), for example, N.N-methylene bis(acrylamide), and a poly(ethylene glycol)$_n$ (n=2-20) diacrylate (nEGDA), for example, a tetra(ethylene glycol) diacrylate. In some of these embodiments the weight ratio of the two difunctional materials can range from 10:1 to 1:10, or from 5:1 to 1:5, or from 2:1 to 1:2 or is 1:1.

In some of any of the embodiments described herein, the hydrogel further comprises a polysaccharide as described herein, for example, CMC, and in some embodiments, an amount of the polysaccharide ranges from 0.5 to 5, or from 0.5 to 3, or from 0.5 to 2, weight percents, of the total weight of the hydrogel.

In some embodiments, the total weight of polymerized and crosslinked materials that form the hydrogel network ranges from about 1% to 20% of the total weight of the hydrogel, or from about 5% to about 20%, by weight, or from about 5% to about 15%, by weight, or from about 8% to about 15%, by weight, or from about 8 to about 12%, by weight, including any intermediate value and subranges therebetween.

A hydrogel as described herein can be readily prepared by preparing a monomeric composition (also referred to herein as a hydrogel forming solution) comprising water, monomeric precursors, hydrogel forming agents, and optionally other agents such as non-crosslinkable agents as described herein, pH adjusting agents, surface active agents, dispersing agents, solubilizing agents, and the like. The monomeric composition is then contacted with an +fdiff that promotes the polymerization and cross-linking reactions that form the fibrous network(s), to thereby form a pre-polymerization composition, which is thereafter subjected to conditions that effect polymerization (e.g., heating). Exemplary monomeric and pre-polymerization compositions and a process of preparing a hydrogel therefrom are presented in the Examples section that follows. Other processes and alternative compositions are described hereinabove, and any combination thereof for forming a hydrogel is contemplated.

According to some example embodiments, the inner walls of the container housing are at least partially lined with a liner made of a material that is configured to raise the water by capillary motion along the container walls. Optionally, the liner is also configured to absorb the water. The liner may be a woven fabric or a non-woven fabric that is capable of transporting water from the bottom of the container upwards based on capillary motion. In some example embodiments, water movement may be achieved by alternate methods. For example the liner may be formed from Luquafleece® by BASF, from Hydrogel® by Katecho or from AmGel by Axelgaard, each of which may provide water movement that is not capillary motion. Size of the pores in the liner may be configured to achieve a desired height of transportation. In some embodiments of the present invention, a same material is used for the liner and the spacing material. Optionally, NAFION® tubing may be used in place of the liner or may be used in addition to the liner to drive water transport for water transport by diffusion. The NAFION® tubing may help transport some of the water seeping to the bottom of the container to the upper portion of the container. The NAFION® tubing may be placed anywhere in the container and is not limited to being placed near the walls of the container. The transport of water may provide for hydrating the upper layers of the hydrogels.

According to some example embodiments, the container includes one or more elongated elements that are configured to provide dedicated air channels to aerate the roots. The elongated elements may be generally vertical (e.g., with a tolerance of 30°) with respect to the bottom of the container or may generally communicate air from above the plant container into the plant container. Optionally, the elongate elements may be helical in shape and may be spiral from a base of the container up to the top of the container. In some examples the elongated elements are in the form of perforated tubes that are penetrated across the layers of hydrogel. Optionally, the elongated elements are formed from strands of fabric or from clay or from perlite or hydrophobic sand or Gortex™ or porous synthetic material. Optionally, columns or walls formed from porous material are penetrated across the layers of hydrogel to extend from the upper portion of the container exposed to air to the lower portion of the container.

In some embodiments of the present invention the columns or walls, the lining and the spacing material layers are all made of the same porous material. Air from the surrounding environment may fill the columns, walls, tubes and/or spacers and thereby aerate the roots planted in the layers. The material may be strands of fabric such as a geotextile or a hallow tube that is perforated.

According to some example embodiments, the bottom of the container is sealed and does not include a drain hole. In some example embodiments the container additionally includes a sensor, such as, but not limited to, a tensiometer or a humidity sensor, for sensing when the plant needs watering and an indicator for alerting someone that watering is required. In some example embodiments, the container additionally includes a sensor configured to sense a plant parameter, e.g. stem thickness. According to embodiments of the present invention, the container and method described herein may be used in plant growing facilities, nurseries, stores and for private use.

According to some example embodiments, a plant is planted in a container that already includes layers of hydrogel and spacing material. In some example embodiments, during planting, a plant is positioned on an upper layer of the spacing material pressed into the spacing material. Subsequently, hydrogel may be added over the spacing material and around the plant to provide water and physical support for the plant. Optionally, a cover such as a fabric may be applied over the hydrogel to reduce evaporation of the hydrogel. In some example embodiments, one or more air channels and/or water channels may be introduced into the growing media. Optionally, the container is pre-lined with a lining. The lining may cover both the inner side walls of the container bottom or base of the container.

According to aspects of some example embodiments, there is provided a kit for growing a plant in a plant growing container. The kit may include the hydrogel as described herein in any of the respective embodiments, a sheet of porous material configured for use as the spacing material as described herein in any of the respective embodiments and at least one elongated element that is porous or otherwise provides an air passage therethrough as described herein in any of the respective embodiments.

The kit may also include assembly instructions. Optionally, the kit includes one or more sensors for sensing parameters of the environment around the plant or parameters of the plant itself as described herein in any of the respective embodiments. Optionally, the kit includes lighting providing the plant need for photosynthesis. Optionally, the kit includes one or more fertilizing agents. The fertilizing agents may be supplied through the plant transport system directly through the leaves or through the roots system. In some examples, the kit includes the plant container for growing the plant.

Any known fertilizing agents are contemplated and can be readily selected by those skilled in the art for a plant and/or soil of choice.

In some example embodiments, a plant may be transferred easily to another container having a different size or shape. In some example embodiments, the plant may be transferred by gathering the liner around the container and lifting the plant together with the surrounding contents and then placing the plant with the surrounding contents in a new container that already includes lining.

Additional layers of hydrogel and porous material may be added as needed based on the size and shape of the new container.

Figure 1B:
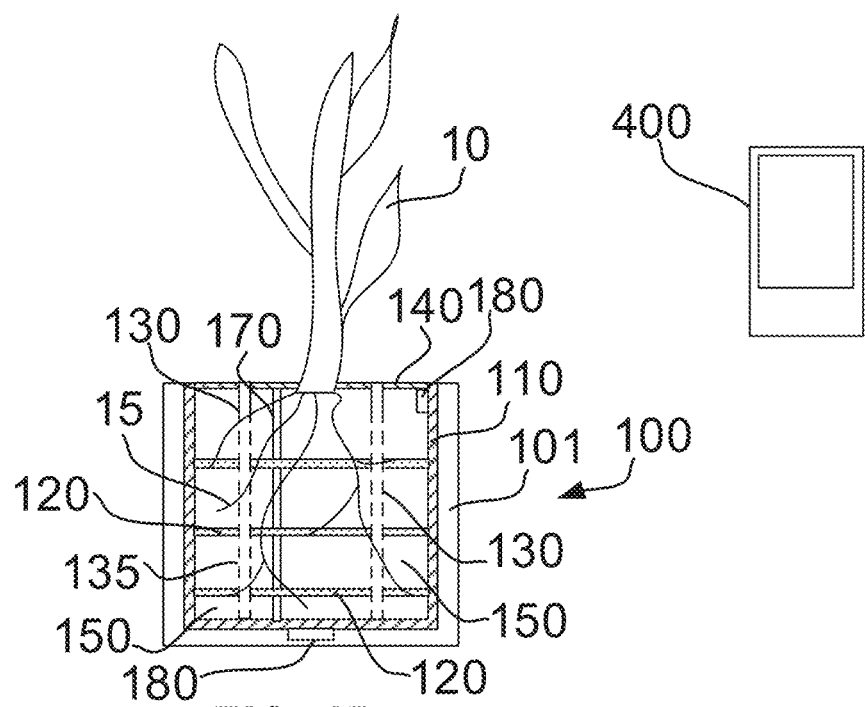

Reference is now made to FIGS. 1A and 1B which are a simplified schematic drawing and a cross-sectional cut of a plant growing container in accordance with some embodiments of the present disclosure. According to some example embodiments, a plant growing container 100 for growing a plant 10 includes a housing 101 without drainage holes. Housing 101 may be formed from plastic, metal, glass, ceramics, wood or the like. A volume of housing 101 affects the irrigation cycles and may be selected to provide a desired irrigation interval. As the volume increases, the amount of available water is greater, and the irrigation interval may be extended.

According to some example embodiments, housing 101 is lined with a liner 110 and filled with alternating layers of hydrogel 150 and spacing material 120. In some example embodiments, hydrogel 150 may be a mix of hydrogel with soil. The ratio of soil to hydrogel may be for is less than 0.4

(soil/hydrogel), less than 0.3, less than 0.2, or less than 0.1. In some example embodiments, hydrogel 150 may be impregnated with a fertilizing agent (e.g., a plant nutrient).

Impregnation may be post-synthesis of hydrogel 150 based on swelling dry hydrogel particles or impregnation may occur as part of the synthesis process. Water absorption action may promote release of the fertilizer agent. Alternatively, slow release capsules releasing fertilizer solution/solids, such as Osmocote® may be added to hydrogel layers.

According to some example embodiments, container 100 additionally includes one more air channels 130 that penetrate through the alternating layers of hydrogel 150 and spacing material 120. The layers of hydrogel 150 and spacing material 120 together form the growing media. Optionally, the upper layer, is a layer of hydrogel 150 and the hydrogel is covered with a cover 140 configured for reducing evaporation of the water in the hydrogel 150. In some example embodiments, a thickness of the layer of spacing material is between 0.05-0.5 of the thickness of the layer of hydrogel.

According to some example embodiments, liner 110 may be a geotextile material that is woven or perforated so includes pores that can stimulate capillary motion for raising water from the bottom of the container along the sidewalls to an upper portion of housing. The capillary action of liner 110 provides mass movement of the water across the hydrogel layers 150. In some exemplary embodiments, the size of the pores is configured to provide for raising the water to a desired height.

A height of the water based on the capillary motion may be defined by the following equation:

$$h = \frac{2\gamma \cos\theta}{\rho g r} \qquad \text{Equation (1)}$$

Where:
h is the height the liquid is lifted,
γ is the liquid-air surface tension,
ρ is the density of the liquid,
r is the radius of the capillary,
g is the acceleration due to gravity,
θ is the angle of contact of the liquid.

In some example embodiments, liner 110 may be selected to have pores with a radius that provides raising the water to a substantially full height 'H' of the container housing 101 or a height to an upper layer of the hydrogel included in the container.

In some example embodiments, NAFION® tubing 170 may be used in place of lining 110 or in addition to lining 110. Tubing 170 may be penetrated generally vertically through the hydrogel (and generally perpendicular to the layers of hydrogel and spacing material) and optionally and preferably causes water to diffuse all along its length and thereby transport water from the bottom of the container to the upper layers. In other example embodiments, liner 110 is not a separate component but rather integral to housing 101.

The hydrogel layers may include hydrogel beads that while fully hydrated may include 0.5-1.5% solids with a volume of between 1 and 100 cm³. The beads may be spherical, cubical, shaped as a pyramid or may have other shapes.

The layer of spacing material 120 is a layer of porous material and may include peat moss, perlite, vermiculite, coconut coir, geotextile and/or other fabric or synthetic porous material such as synthetic polymer. Optionally, the layer of spacing material 120 may be an integral part of the housing 101 or liner 110. Typically, all the layers of spacing material 120 may be formed from a same material. Optionally, both spacing material 120 and liner 110 are formed from a same material, e.g. same geotextile and/or fabric. Alternatively, one or more layers of spacing material may be formed from different types of material. According to some example embodiments, the layer of spacing material 120 provides aeration between the hydrogel and also provides a growing path to support root growth. In some example embodiments, spacing material 120 and air channels together provide for reaching an oxygen flux in the root zone of about or at least 10 g $O_2$ $m^{-2}$ $d^{-1}$. Optionally, layers of spacing material 120 are configured to be significantly thinner than layers of hydrogel 150 to maintain a high water-containing capacity of the container.

The one or more air channels 130 may be an elongated element that is porous. Air channels 130 may be formed from strands of fabric, clay or perlite, hydrophobic sand or porous synthetic material such as for example Gortex™. Optionally, air channels 130 may be an elongated tube with holes 135 along its length. In some example embodiments, air channels may be formed from strips of geotextile materials. The strips may extend along an entire height 'H' of container housing 110 or may extend along a portion of height 'H.' Optionally, air channels 130, spacing material 120 and liner 110 are all formed from a same material, e.g. a fabric and/or geotextile material. Alternately, air channels 130 may be staffs or stakes formed with a porous material such as clay through which air can pass. Typically, the size of the perforations and tubing is defined to large enough to avoid water rising through them by capillary motion and thereby plugging the air passage. Optionally, the air channels are formed from a material that is hydrophobic. In some example embodiments, the air channels 130 provide aeration to the roots along the height 'H' of container 100 and may facilitate root growth towards the bottom of container 100. In some example embodiments, air channels 130 may be integral to housing 101 and may be formed from the same material as housing 101. For example, housing 101 including air channels 130 may be formed by an injection molding process. In such a case, liner 110 may be added to housing 101 that already includes air channels 130.

Cover 140 may be configured to cover an upper layer of hydrogel 150. Optionally, cover 140 is formed from the same material as spacing material 120. Optionally, cover 140 may be thicker than spacing material 120 to provide protection against dehydration. In some examples, cover 140 may be formed from polyurethane foam. In some example embodiments, cover 140, air channels 130, spacing material 120 and lining 110 are all formed with the same material. Optionally, a volume of container 100 is at least 200 cubic cm.

In some example embodiments container 100 may include a sensor 180 that senses a hydration level of container 100. Sensor 180 may be position anywhere within the container. Optionally more than one sensor 180 is included in container 100.

In some example implementation, sensor 180 is a scale that is configured to detect weight of container 100 and its contents. Sensor 180 may for example be positioned on a bottom surface of housing 101 (inner or outer surface) and may transmit sensed weight by wireless or wire transmission. In some example embodiments, a reduction of weight may be associated with dehydration of container 100. In some example embodiments, sensor 180 is applied to monitor the weight of container 100 and to provide an alert when the weight is below a defined threshold.

Output from sensor 180 may be associated with an indicator that alerts a user as to when to water the plant. The indicator may be positioned on housing 101 or may be transmitted by wireless transmission to an electronic device 400 that is operated by the user, e.g. mobile telephone.

Optionally, an application on a mobile device receives input from sensor 180 and provides an alert when watering is required.

Figure 1C:
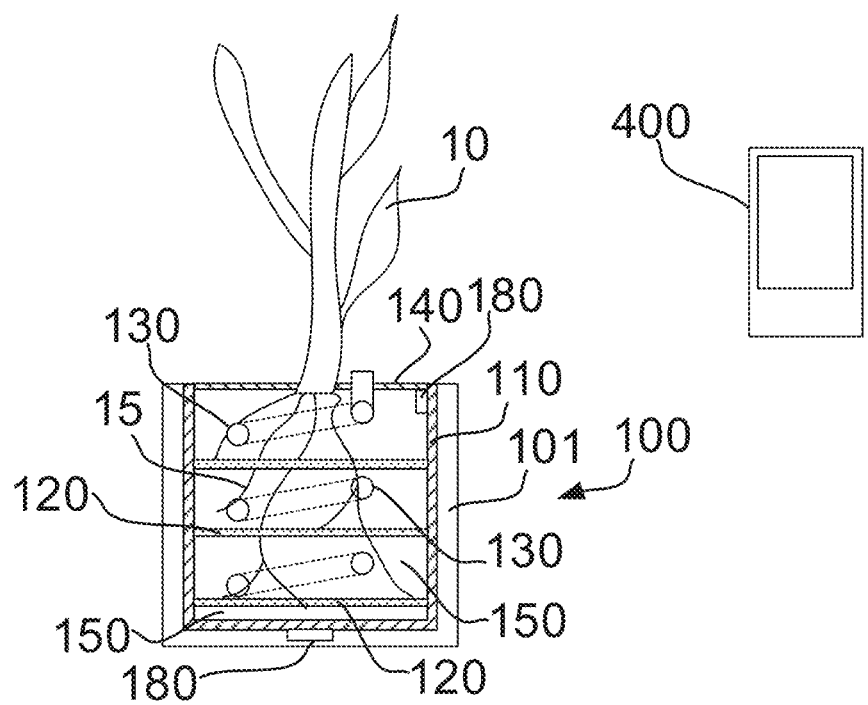
FIG. 1C is a simplified schematic drawing of a plant growing container including a helical air channel in accordance with some embodiments of the present disclosure.

Referring now to FIG. 1C, in some example embodiments one more air channels 130 that penetrate through the alternating layers of hydrogel 150 and spacing material 120 may have a helical configuration that substantially spiral around main axial orientation of plant 10. The helical configuration of air channel 130 may be formed from strands of fabric, clay or perlite, hydrophobic sand or porous synthetic material such as for example Gortex™. Air channels 130 may generally provide for penetrating air into volume defined by housing 101, e.g. around roots 15.

Figure 1D:
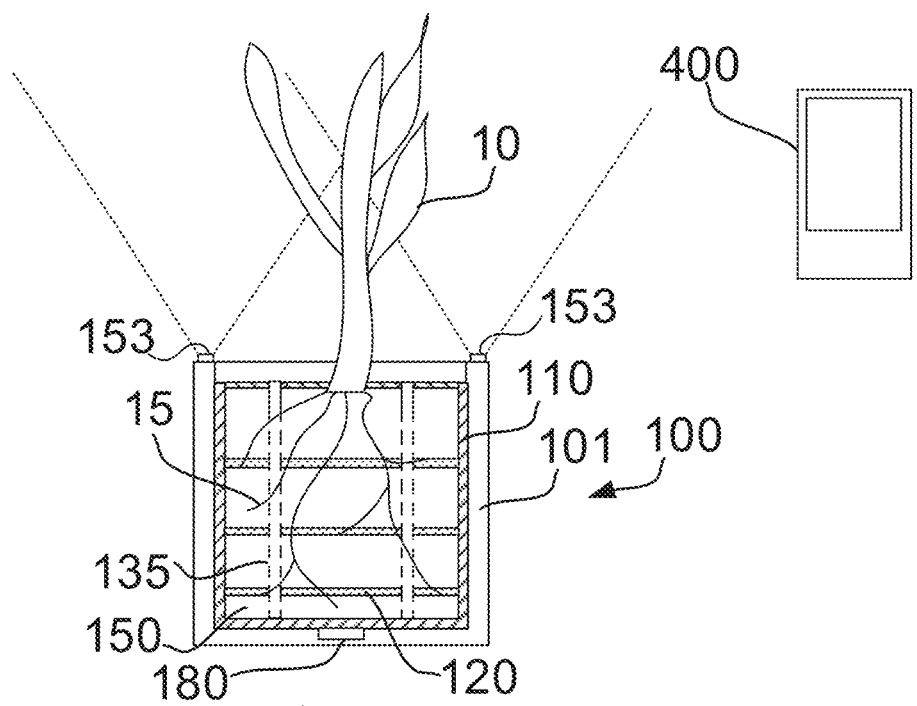
FIG. 1D is a simplified schematic drawing of a plant growing container with integrated lighting in accordance with some embodiments of the present disclosure.

Reference is now made to FIG. 1D showing a simplified schematic drawing of a plant growing container with integrated lighting in accordance with some embodiments of the present disclosure. In some example embodiments, a light system 153, e.g. including one or more lamps or light emitting diodes (LEDS) may be integrated in housing 101 and may be configured to provide illumination to plant 10. In some example embodiments, the illumination provided is configured to be solar radiation in the spectrum of Photosynthetically Active Radiation (PAR) (wavelength of 400-700 nm). In some example embodiments, light system 153 may be configured to supply a photon flux of 50-600 (μmol m-2s-1) to facilitate proper plant photosynthesis.

In some alternate example embodiments, light system 153 may be connected to and above housing 101 and/or exit from the center of the container. Alternatively, dedicated light system 153 may be separate from housing 101, e.g. hang above housing 101 on an adjacent wall.

Figure 2:
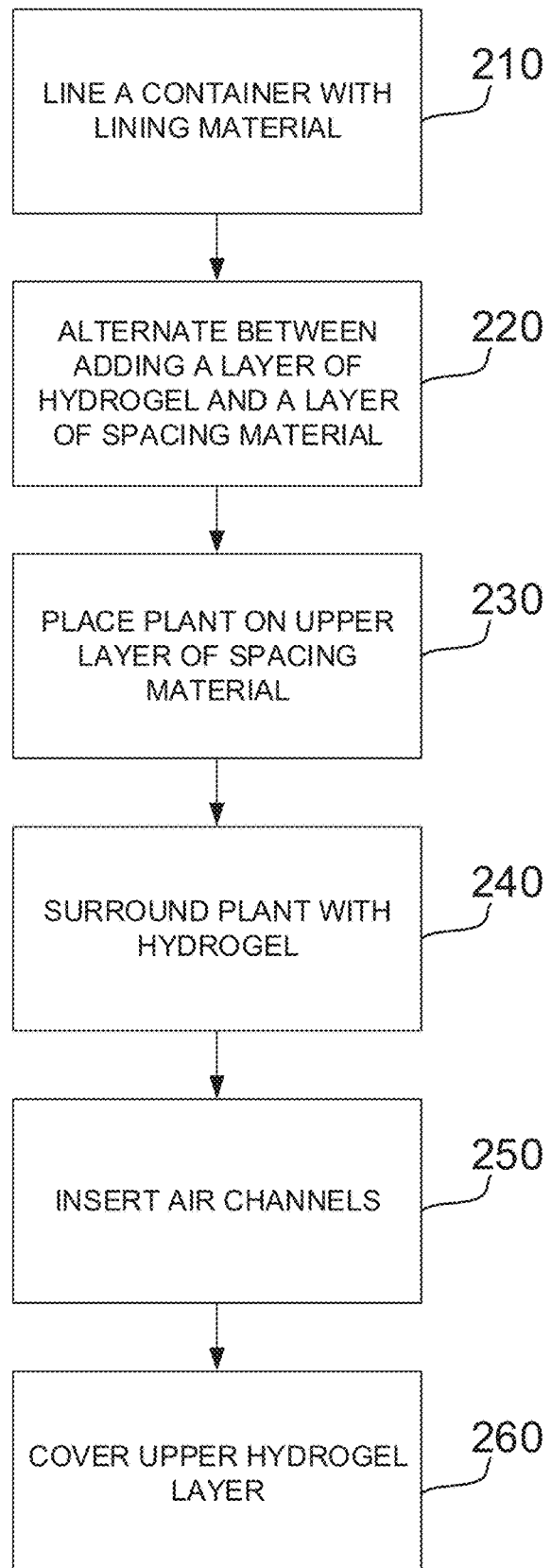
FIG. 2 is a simplified flow chart of an example method for building a container for growing plants in accordance with some embodiments of the present disclosure.

Reference is now made to FIG. 2, a simplified flow chart of an example method for building a container for growing plants in accordance with some embodiments of the present disclosure. According to some example embodiments, a housing of a container is lined with a fabric (block 210). The fabric may be a geotextile and may typically include pores that are sized to facilitate capillary motion of water added to the container. Subsequently, two or more layers of hydrogel separated by two or more layers of spacing material are added into the housing of the container (block 220). Optionally, the bottom most layer is a layer of hydrogel and the upper most layer is a layer of spacing material. In some example embodiments, the hydrogel is hydrated prior to adding the hydrogel into the housing of the container. Optionally the plant with roots is placed on the upper layer of spacing material (block 230). Hydrogel may then be positioned around the plant to support the plant (block 240). Furthermore, one or more air channel, e.g. air channel spokes may be penetrated through the hydrogel layers and layers of spacing material (block 250). Optionally, the spokes may be added after the plant is planted in the plant growing container. Optionally, NAFION® tubing is also added to the hydrogel layers and layers of spacing material. In some examples, the upper layer of hydrogel may be covered to reduce evaporation of the water in the hydrogel (block 260).

In some example embodiments, the plant may be easily transferred to another container housing by lifting the plant together with the contents of the container. The lining may typically be flexible and serve as a sack for lifting the plant.

Figure 3A:
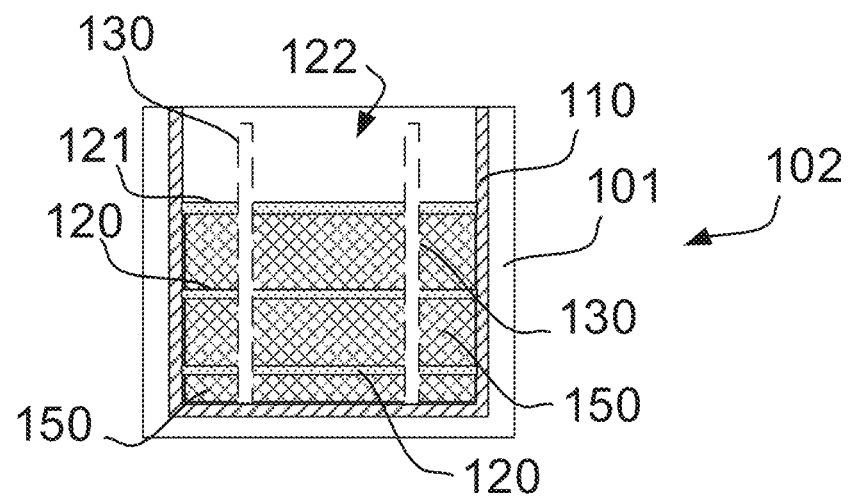
FIGS. 3A, 3B, 3C and 3D are simplified schematic drawings of a plant growing container prior to planting, during planting (two steps) and an extended period after planting in accordance with some embodiments of the present disclosure.

In other example methods, the plant may be positioned in one or more of the lower layers of the gel and/or the layers may be constructed after the plant is positioned in the plant growing container. Reference is now made to FIGS. 3A, 3B, 3C and 3D showing simplified schematic drawings of a plant growing container prior to planting, during planting (two steps) and an extended period after planting in accordance with some embodiments of the present disclosure. According to some example embodiments, a plant container 102 that is pre-filled with growing media and without a plant as shown in FIG. 3A is constructed and may be sold to a customer. Container 102 may include one or more layers of hydrogel 150 separated by layers spacing material 120. Optionally, hydrogel 150 may be mix with soil, e.g. potting soil. An upper portion 122 of container 102 may be empty and configured for receiving a plant. One more air channels 130 may be positioned in container 102 prior to planting. Optionally, NAFION® tubing may also be inserted in container 102 prior to planting (although not shown here for simplicity purposes). Optionally, prior to planting, hydrogel 150 is hydrated.

Figure 3B:
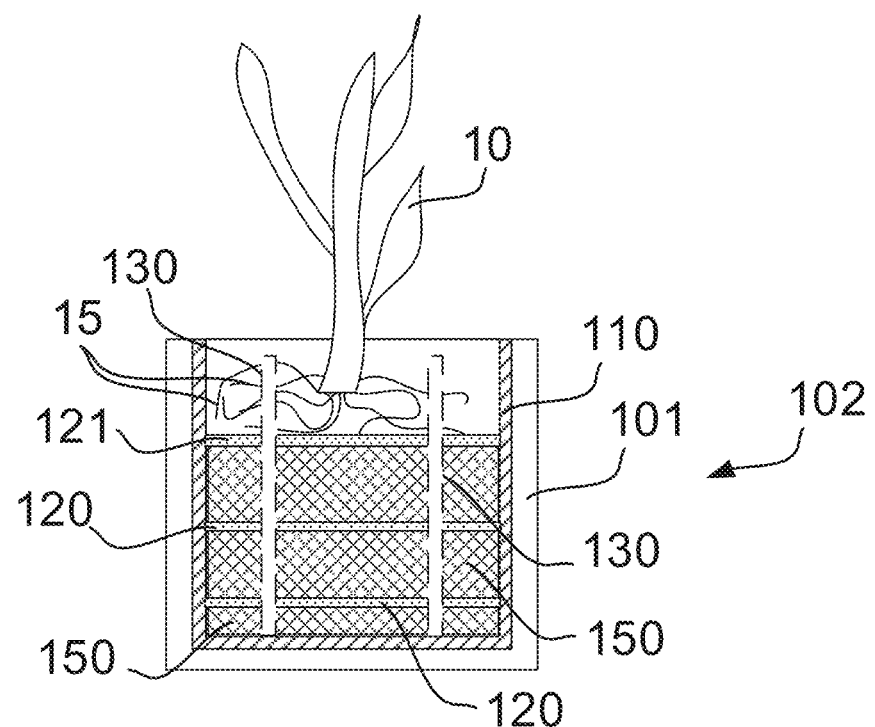
Figure 3C:
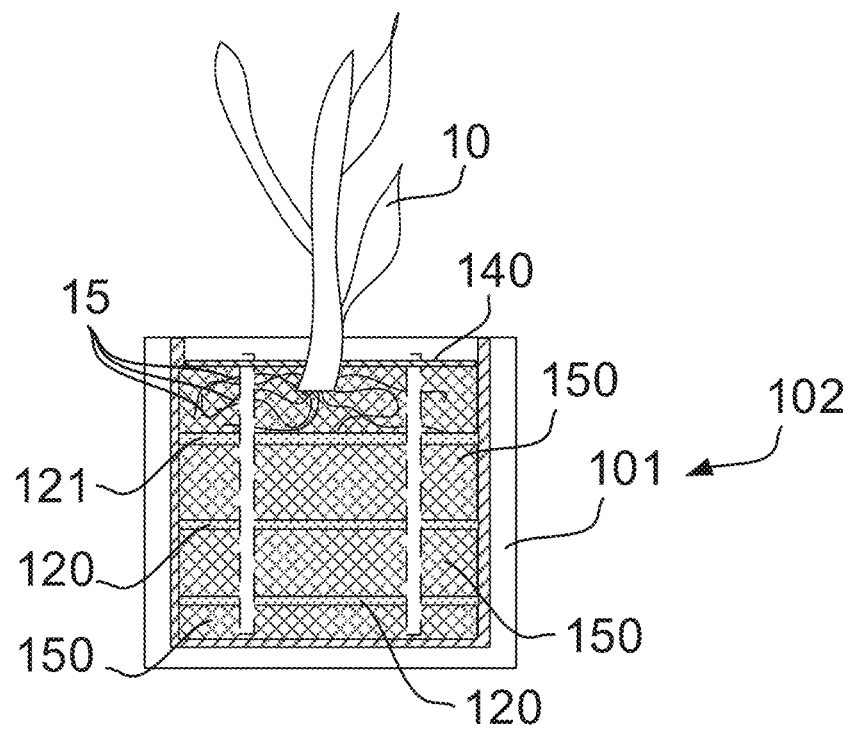
Figure 3D:
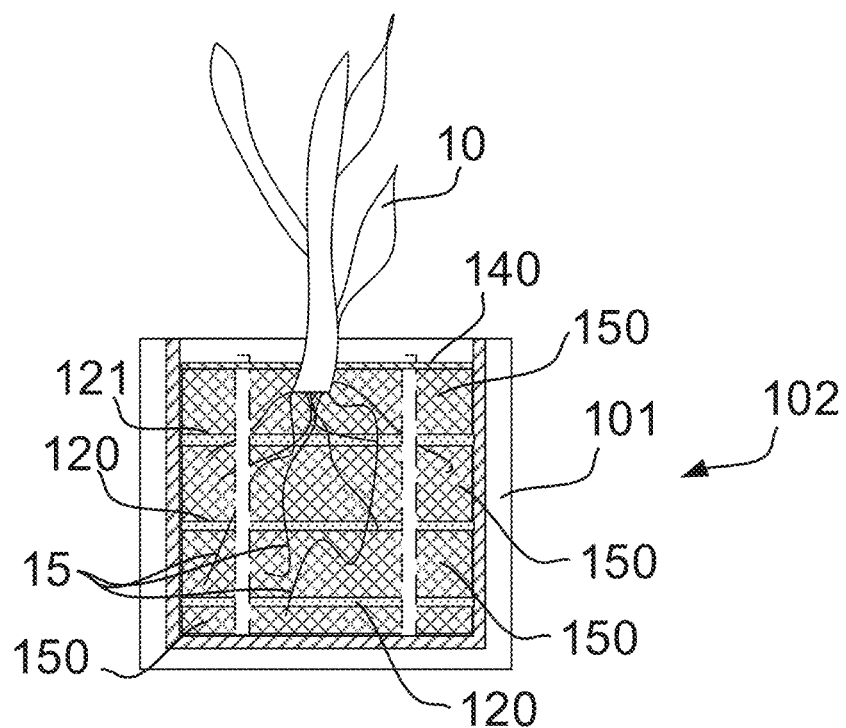

Referring to FIGS. 3B and 3C, a plant 10 is positioned over an uppermost layer of spacing material 121 and hydrogel 150 may be positioned around plant 10 to stabilize plant 10. Roots 15 of plant 10 are positioned over spacing material 120. Optionally, hydrogel 150 added around plant 10 is hydrated prior to adding it. Referring now to FIG. 3D, in some example embodiments, container 102 is configured over time to promote growth of roots 15 downward toward the lower layers of hydrogel 150.

Figure 4:
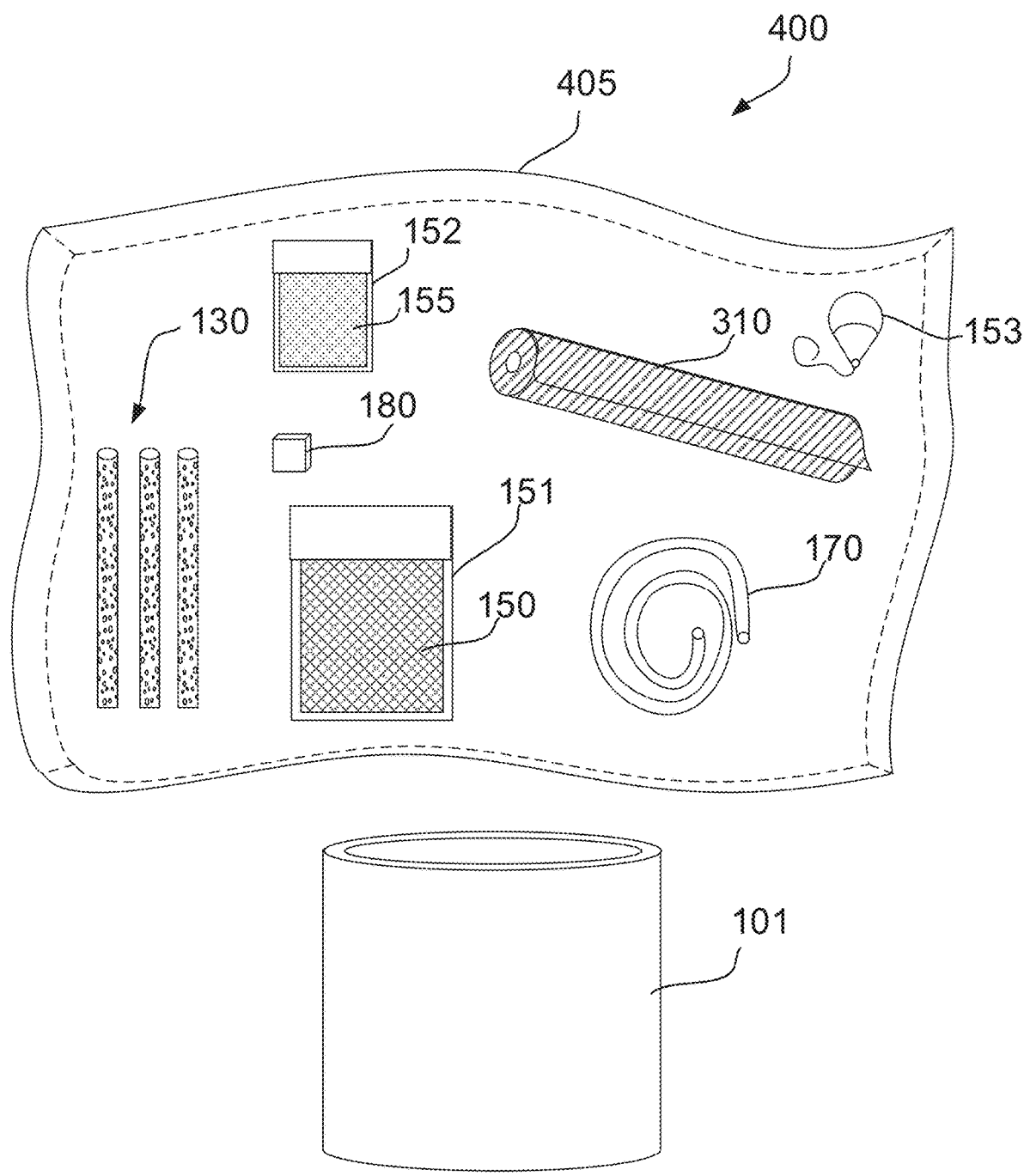
FIG. 4 is a schematic drawing of a first planting kit in accordance with some embodiments of the present disclosure.

Reference is now made to FIG. 4 showing a schematic drawing of a first planting kit in accordance with some embodiments of the present disclosure. In some example embodiments, a kit 400 may include a package 405 containing components for constructing a plant growing container. The plant growing container may be constructed in any housing 101 large enough to contain a plant and that does not include drain holes. Optionally, kit 400 includes housing 101.

Kit 400 may include a container 151 with hydrogel 150, porous sheet or fabric 310, e.g. geotextile. Porous material 310 may be configured to be used for liner 110, spacing material 120, and/or cover 140. Alternatively, more than one type of porous sheet or fabric 310 is provided, each dedicated for a different purpose. Kit 400 includes one or more air channel 130 in the form of stakes that may be penetrated through the layers of hydrogel 150 and spacing material 120. Optionally, kit 400 includes slow release capsules configured to release fertilizer solution or solids, e.g. Osmocote® product. In some example embodiments, hydrogel 150 may already be impregnated with a fertilizer agent. Impregnation may be based on impregnating hydrogel 150 post-synthesis by swelling dry hydrogel particles. Optionally, hyrodgel 150 may be synthesized with the fertilizer agent. Water absorption may promote release of the fertilizer agent.

Optionally, kit 400 additionally includes one or more sensors 180 to sense parameters of the environment surrounding the plant and/or of the plant itself, e.g. a hydration sensor and a stem thickness sensor and/or NAFION® tubing 170. Contents of container 151 may include hydrogel only or may include hydrogel mixed with additional material, e.g. soil. In some example embodiments, kit 400 may include a dedicated trellis or other dedicated plant support structure. Optionally, kit 400 includes a second container 152 with soil 155 that may be mixed or added as an additional layer(s) in the container. Optionally, kit 400 may also include light system 153, e.g. a lamp configured to provide the plant need for photosynthesis. In some example embodiments, light system 153 may be configured to supply a photon flux of 50-600 (μmol m-2s-1) with solar radiation (wavelength of 400-700 nm). The light fixture may for example be LED lighting. Alternatively, light system 153 may be integrated on housing 101 for example as disclosed herein above in reference to FIG. 1D. Kit 400 may include or may be accompanied with a dedicated housing 101. Alternatively, kit 400 may exclude housing 101. Optionally, kit 400 may be provided in a plurality of sizes, each size configured for different size containers.

Figure 5:
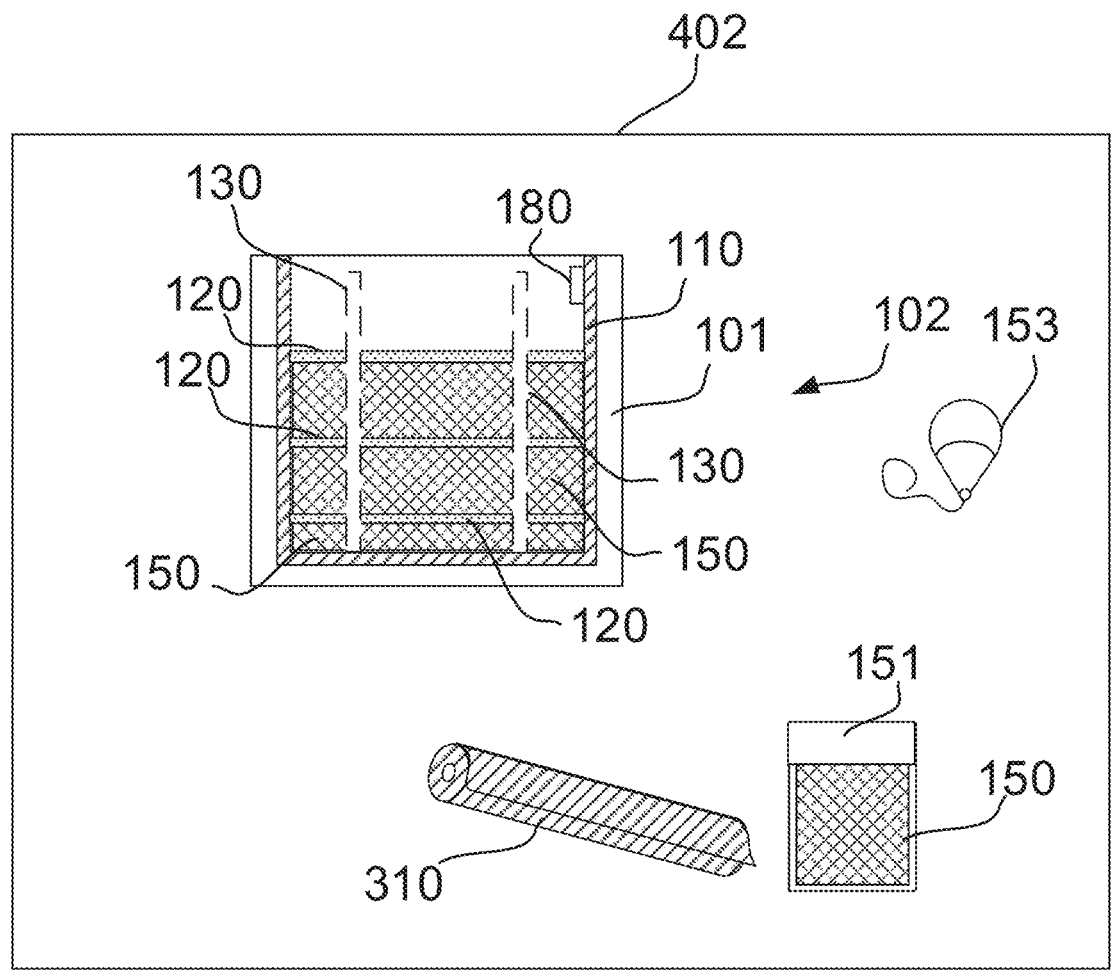
FIG. 5 is a schematic drawing of a second planting kit in accordance with some embodiments of the present disclosure.

Reference is now made to FIG. 5, showing a schematic drawing of a second planting kit in accordance with some embodiments of the present disclosure. According to some example embodiments, a kit 402 may include a housing 101 that is at least partially preassembled. Housing 101 may be for example be lined with lining 110 and may house alternating layers of hydrogel 150 and spacing material 120. One or more air channels 130 may also be pre-assembled in housing 101. Optionally, one or more sensors 180 may also be mounted in or on housing 101. In some example embodiments, only a portion of the layers are pre-assembled in housing 101, during assembly a user may position the plant on the pre-assembled layers and then add additional layer over the pre-assembled layers. and the rest of the layers may be added. Additional porous sheet or fabric 310 and hydrogel 150 may be included in the kit for this purpose. Alternatively, a user may dig a hole through the pre-assembled layers and introduce the plant inside the hole. In some example embodiments, kit 402 a dedicated trellis or other dedicated plant support structure is may be pre-installed in housing 101.

The present invention, in some embodiments, relates to a hydrogel for use as a substrate for growing a plant, such as in a container, in some embodiments in the absence of soil.

According to an aspect of some embodiments of the present invention, there is provided a hydrogel comprising polyacrylic acid, the hydrogel comprising cross-links selected from residues of at least one difunctional acrylic material selected from the group consisting of MBA, TTEGDA and combinations thereof, the hydrogel further comprising an acid neutralizer comprising NaOH, KOH and combinations thereof. According to some embodiments, the acid neutralizer comprises NaOH. According to some embodiments, the acid neutralizer comprises KOH. According to some embodiments, the acid neutralizer comprises NaOH and KOH. According to some embodiments, the hydrogel further comprises HEA. According to some embodiments, the hydrogel further comprises SPS.

According to an aspect of some embodiments of the present invention, there is provided a hydrogel comprising polyacrylic acid, the hydrogel comprising cross-links selected from residues of at least one difunctional acrylic material selected from the group consisting of MBA, TTEGDA and combinations thereof, the hydrogel further comprising a non-crosslinked additive comprises CMC having a molecular weight of in the range of from about 90 kDa to about 1,000 kDa. In some embodiments, the CMC has a molecular weight of 90 kDa. In some embodiments, the CMC has a molecular weight of 250 kDa.

According to an aspect of some embodiments of the present invention, there is provided a hydrogel comprising polyacrylic acid, the hydrogel comprising cross-links comprising residues of at least one difunctional acrylic material selected from the group consisting of trimethylolpropane ethoxylate triacrylate (TMPETA), triglycerol diacrylate (TGDA), polyethyleneglycol diacrylate (PEGDA), pentaerythritol tetracrylate (PET), pentaerythritol triacrylate (PETT) and combinations thereof. According to some embodiments, the hydrogel further comprises HEA. According to some embodiments, the hydrogel further comprises CMC. According to some embodiments, the hydrogel further comprises SPS. According to some embodiments, the hydrogel further comprises NaOH.

According to some embodiments, the hydrogel comprises a polysaccharide selected from the group consisting of hemicellulose, nanocellulose, lignin, sugar cane bagasse, kapok fiber, chitin and sodium alginate, hyaluronic acid, and a gum (such as xanthan gum, dextran, welan gum, gellan gum, diutan gum) combinations thereof.

In some embodiments, the hydrogel comprises a non-crosslinked additive which is a clay selected from the group consisting of montmorillonite, vermiculite, kaolinite and combinations thereof.

In some embodiments, the hydrogel comprises a polymerization initiator comprising a light initiator. In some embodiments, the light initiator is selected from the group consisting of 2,2-Dimethoxy-2-phenylacetophenone, lithium phenyl-2,4,6-trimethylbenzoylphosphinate, Igracure® photoinitiators and combinations thereof.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

Some features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The gel or hydrogel or other substrate of the present invention, or the plant-growing substrate of the present invention, may provide one or more environment-related benefits or advantages, and/or may be regarded as a "green" product or as environmentally friendly product, and/or may contribute to (or may cause) preservation or saving of water and/or irrigation water and/or irrigation resources and/or irrigation-related manpower and/or irrigation-related energy. For example, the gel or hydrogel of the present invention may absorb or may mop up or may otherwise retain water or irrigation water, and may then gradually and/or slowly release such water which in turn irrigate and nurture the plant, thereby providing efficient irrigation that efficiently utilizes irrigation water. For example, in some embodiments, one kilogram of the gel of the present invention, may absorb approximately ten kilograms of water; and may later gradually release the water towards the plant. Utilization of the gel or hydrogel of the present invention may thus lead to significant saving or reduction in the quantity of water required for irrigating a plant, as well as a reduction in the number of maintenance trips or maintenance visits required to maintain such plant (thereby causing also a saving or reduction in energy, in gas or fuel or fossil fuels, in electric energy, or other resources related to transportation and maintenance of plants), as well as reduction or elimination of an electricity-based or electric irrigation system (thereby saving electric energy). In a demonstrative experiment, a plant container having a volume of approximately 80 to 100 liters, when filled with the gel or hydrogel of the present invention, over a period of 3 or 6 or 9 months, may require 50 percent (or less) of the quantity of water that would have been conventionally required for irrigation if such plant container was filled with soil and not with hydrogel. Such plant container may also require one or two maintenance visits per week when filled with soil and irrigated with water; whereas, the same plant container may require one maintenance visit per three months when filled instead with the gel or hydrogel of the present invention. In some embodiments, the polymer-based gel or hydrogel of the present invention may be utilized as a substrate for growing a plant, instead of utilizing peat or other type of soil which is typically mined for particular regions in the world and is then transported (sometimes internationally); thereby saving the natural resource of peat or soil, and saving energy that otherwise would be spent on mining and transporting such peat or soil. In some embodiments, peat or soil of a plant container should be changed or replaced (e.g., on a yearly basis), whereas the gel or hydrogel of the present invention may serve the same plant container for several years. In some embodiments, utilization of the gel or hydrogel of the present invention may further reduce non-desired water leakage or water loss (e.g., as sometimes reflected in water draining away from a conventional plant having soil therein), and/or may prevent water-related damage or damage from excess watering of a plant (e.g., excess water being used as an environment for parasites or fungi or mosquitoes, or attracting to the plant non-desired animals or pests).

Some embodiments of the present invention include a hydrogel comprising: a cross-linked polymer selected from the group consisting of: polyacrylic acid, polyacrylamide, and combinations thereof; wherein the hydrogel comprises cross-links selected from residues of at least one difunctional acrylic material selected from the group consisting of: MBA, TTEGDA. and combinations thereof.

In some embodiments, said at least one difunctional acrylic material comprises a mixture of MBA and TTEGDA.

In some embodiments, a ratio of said MBA to said TTEGDA is in the range of from about 10:1 to about 1:10, or in the range of 10:1 to 1:10, or in the range of 5:1 to 1:5, or in the range of 8:1 to 1:8, or in the range of 3:1 to 1:3.

In some embodiments, the hydrogel further comprises a non-crosslinked additive.

In some embodiments, said non-crosslinked additive is a macromolecule selected from the group consisting of polycaprolactone, polyvinylalcohol (PVA), polysaccharides, and combinations thereof.

In some embodiments, said polysaccharide is selected from the group consisting of: dextran, alginate, agarose, chitosan, hyaluronic acid, starch, hydroxypropyl cellulose (HPC), carboxymethyl cellulose (CMC), k-carrageenan, i-carrageenan, and combinations thereof.

In some embodiments, said non-crosslinked additive is selected from the group consisting of: PVA, CMC, and combinations thereof.

In some embodiments, said polysaccharide is selected from the group consisting of: alginate methacrylate, sodium salt of alginic acid, glycol chitosan methacrylate, hyaluronic acid methacrylate, glycol chitosan methacrylate, and combinations thereof.

In some embodiments, said cross-linked polymer comprises polyacrylic acid; and the hydrogel further comprises an acid neutralizer comprising NaOH.

In some embodiments, said cross-linked polymer further comprises HEA monomer residues.

In some embodiments, the hydrogel further comprises a polymerization initiator.

In some embodiments, said polymerization initiator is sodium persulfate (SPS).

In some embodiments, the hydrogel comprises polyacrylic acid, a mixture of MBA and TTEGDA, NaOH, HEA, CMC and SPS.

In some embodiments, the hydrogel has a degree of crosslinking in the range of from 0.4 to 4.

In some embodiments, said cross-linked polymer comprises polyacrylic acid; wherein the hydrogel further comprises an acid neutralizer comprising KOH.

In some embodiments, said non-crosslinked additive comprises CMC having a molecular weight in the range of from 90 kDa to 1,000 kDa.

In some embodiments, said polymerization initiator comprises a light initiator, which is (or which may optionally be) selected from the group consisting of: 2,2-Dimethoxy-2-phenylacetophenone, lithium phenyl-2,4,6-trimethylbenzoylphosphinate, Igracure® photoinitiators, and combinations thereof.

In some embodiments, a method for the preparation of a hydrogel, comprises: (a) combining the following components in water to provide an aqueous hydrogel precursor solution: (i) CMC, (ii) acrylic acid, (iii) HEA, (iv) NaOH, (v) MBA and TTEGDA, (vi) SPS; and (b) heating said hydrogel precursor solution whereby polymerization and crosslinking of said acrylic acid occurs to provide said hydrogel.

In some embodiments, the method comprises: (A) providing said CMC as a first aqueous solution; (B) providing said acrylic acid as a second aqueous solution; (C) mixing said first aqueous solution and said second aqueous solution to form a third aqueous solution; (D) adding the following components to said third aqueous solution to provide said hydrogel precursor solution: (I) HEA, (II) NaOH, (III) MBA and TTEGDA, (IV) SPS.

In some embodiments, a method for growing a plant, comprises: (a) providing a hydrogel as a growth medium for said plant; wherein the hydrogel comprises a cross-linked polymer selected from the group consisting of: polyacrylic acid, polyacrylamide, and combinations thereof; wherein the hydrogel comprises cross-links selected from residues of at least one difunctional acrylic material selected from the group consisting of: MBA, TTEGDA. and combinations thereof, (b) placing said plant in said growth medium in the absence of soil (or, in a growth medium that lacks any soil, or in a growth medium that is soil-less); (c) allowing said plant to grow in said growth medium in the absence of soil.

Various embodiments and aspects of the present invention as delineated hereinabove and as claimed in the claims section below find experimental support in the following examples.

EXAMPLES

Reference is made to the following examples, which together with the above descriptions illustrate some embodiments of the invention in a non-limiting fashion.

Example 1

Preparation of an Exemplary Acrylic Acid-Based Hydrogel

Materials:
- Acrylic Acid (abbreviated herein as AA)—CAS Number 79-10-7, was obtained from Sigma Aldrich.
- N,N-methylene bis acrylamide (abbreviated as MBA), CAS Number: 110-26-9, was obtained for small scale production from Sigma Aldrich, and for large scale production from Zibo Xiney, China.
- Tetraethylene Glycol Diacrylate (abbreviated as TTEGDA), CAS Number 17831-71-9, was obtained from Sigma Aldrich.
- Hydroxy ethyl acrylate (abbreviated as HEA) was obtained from Sigma Aldrich.
- Acryl amide (abbreviated as AAm) was obtained from Sigma Aldrich.
- Alginic acid sodium salt (Viscosity=15-25 cP, 1% in water), CAS number 9005-38-3, was obtained from Sigma Aldrich.
- Polyvinyl alcohol (abbreviated as poly) was obtained from Sigma Aldrich.
- Carboxymethyl cellulose (abbreviated as CMC) Sodium salt Mw=90 kDa, CAS Number 9004-32-4, for small amount obtained from Sigma Aldrich, for large amount obtained from Changshu Wealthy Science and Technology, China.
- Sodium persulfate (SPS), CAS Num;
- er 7775-27-1, was obtained for small scale production from Sigma Aldrich, for large scale production from Hebei Yatai, China.
- Deionize water (abbreviated as DIW).
- Sodium hydroxide (NaOH), in a form of pearls, AR grade, CAS Number 1310-73-2, was obtained from Biolab, Israel.

Equipment:
- 10 L beaker (×2)
- 5 L beaker (5 L) (×2)
- Beaker mug (1 L) (×7)
- Mechanical stirrer (×2)
- Safety latex gloves
- Thermal protection gloves
- Lab scales
- Thermometer
- pH meter
- Furnace for 85° C.

Preparation of a Monomer Solution (about 50 Kg):

Table 1 below presents the composition of the monomer solution:

TABLE 1

| weight (Kg) | Material |
|---|---|
| 5.02 | AA |
| 43.63 | Water |
| 1.25 | NaOH dry |
| 0.0502 | TTEGDA |
| 0.0502 | MBA |
| 10.04% | Total monomers |
| 0.45 | NaOH/AA (mol/mol) |

43.63 Kg DIW, 5.02 Kg AA and 1.25 Kg of dry NaOH were added to a reaction container and the mixture was stirred for 30 minutes until dissolution of NaOH. 50.2 grams MBA and 50.2 grams TTEGDA were then added and the mixture was stirred for 30 minutes until dissolution.

Preparation of a Pre-Polymerization Solution:

20 grams of SPS (initiator) were added to 10 Kg of the monomer solution and the obtained mixture was stirred using a mechanical stirrer for 20 minutes. The obtained solution can be stored at 4° C. for up to 48 hours.

Preparation of the Hydrogel:

5 Kg of a pre-polymerization solution was placed in 5 L lock & lock Containers, and the containers were sealed and placed in an oven heated at 85° C., for, for example, 140 minutes. Different reaction times are observed for different types of oven.

Using the above procedure, additional hydrogels were prepared from the monomeric solutions (e.g., 10 Kg solutions) presented in Tables 2-6 below.

TABLE 2

(Formulation A)

| weight % | Material |
|---|---|
| ~80.2 | Water |
| ~6.3 | AA |
| ~0.8 | NaOH dry |
| ~0.04 | TTEGDA |
| ~8.5 | HEA |
| ~4.2 | PVA |
| ~19% | Total monomers |
| 0.23 | NaOH/AA (mol/mol) |

TABLE 3

(Formulation B)

| weight % | Material |
|---|---|
| ~81 | Water |
| ~2.2 | AA |
| ~0.9 | NaOH dry |
| ~0.04 | TTEGDA |
| ~6.8 | AAm |
| ~9 | CMC |
| ~10% | Total monomers |
| 0.23 | NaOH/AA (mol/mol) |

TABLE 4

(Formulation C)

| weight % | Material |
|---|---|
| ~88 | Water |
| ~6.2 | AA |
| ~0.8 | NaOH dry |
| ~2.1 | HEA |
| ~0.1 | MBA |
| ~0.08 | TTEGDA |
| ~0.8 | CMC |
| ~1.7 | Alginate |
| ~11% | Total monomers |
| 0.23 | NaOH/AA (mol/mol) |

TABLE 5

(Formulation E)

| weight % | Material |
| --- | --- |
| ~88 | Water |
| ~7.5 | AA |
| ~1 | NaOH dry |
| ~2.5 | HEA |
| ~0.12 | MBA |
| ~0.1 | TTEGDA |
| ~1 | CMC |
| ~11% | Total monomers |
| 0.24 | NaOH/AA (mol/mol) |

TABLE 6

(Formulation F)

| weight % | Material |
| --- | --- |
| ~86 | Water |
| ~2.8 | AA |
| ~1.1 | NaOH dry |
| ~8.4 | AAm |
| ~0.08 | MBA |
| ~1.3 | CMC |
| ~12% | Total monomers |
| 0.7 | NaOH/AA (mol/mol) |

Example 2

Water Uptake Experiments

A growing kit apparatus as described herein, and 1.5 L container were used.

In a first set of experiments, a hydrogel formed from a monomeric solution as described in Table 5 above was used, and, for comparison, hydrogels marketed as STOCKOSORB 500 XL and 660 XL by Evonik® were used. STOCKOSORB 500 XL hydrogel comprises a copolymer of acrylic acid/acryl amide. STOCKOSORB 600 XL comprises a homopolymer of acrylic acid. The hydrogels contained tap water.

Cherry tomato young plants were put in the respective container and were grown indoors, at room temperature with average humidity of 50-60%, and while using LED lighting (approx. 200 PPFD).

Figure 6:
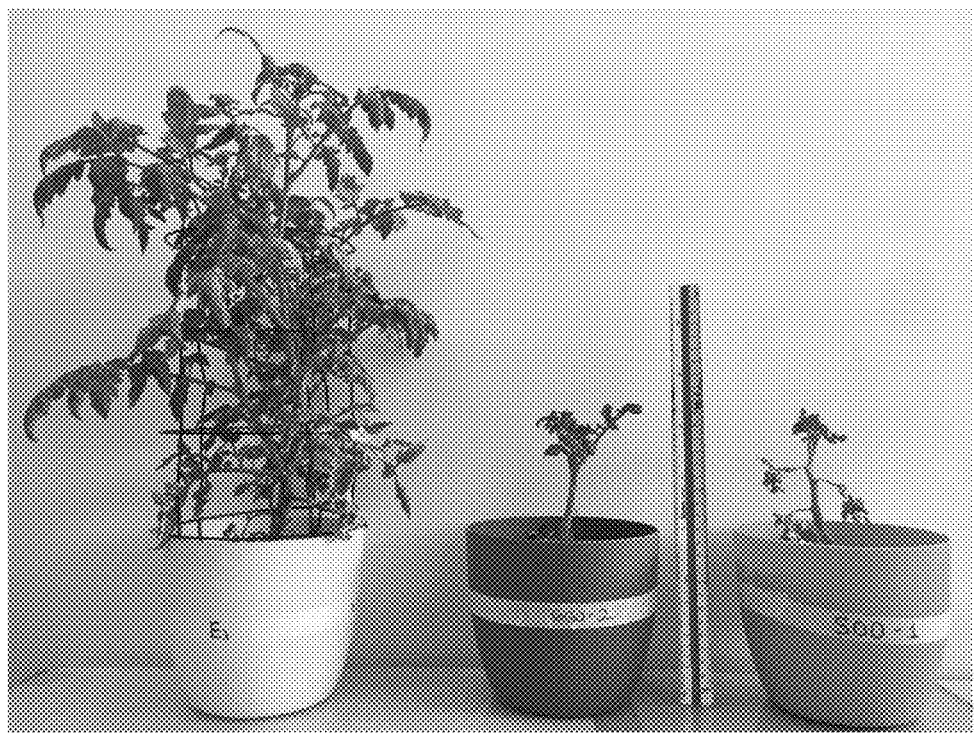
FIG. 6 presents a photograph of cherry tomato plants grown inside a planting kit according to some of the present embodiments, using three different hydrogels: a hydrogel formed of formulation E as shown in Example 1, Table 5 (Yellow container); STOCKOSORB 660 XL hydrogel (Grey container) and STOCKOSORB 500 XL hydrogel (orange container).

FIG. 6 presents photographs of the tomato plants in each container after 48 days. As shown therein, the leaves of the tomato plants grown with STOCKOSORB 500 XL and 660 XL hydrogels became purple and dry. No plant vitality was observed with STOCKOSORB 500 XL and 660 XL hydrogels, while in the tested hydrogel formulation E tomatoes appeared on the plant (still unripe).

Figure 7:
FIG. 7 presents a photograph showing the shoot system of cherry tomato plants tested in the different hydrogels, after 48 days of plant growth: left—formulation E hydrogel; middle—STOCKOSORB 660 XL hydrogel; and right—STOCKOSORB 500 XL hydrogel.
Figure 8A:
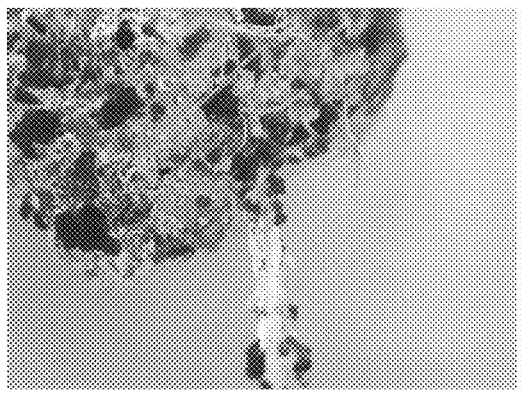
FIGS. 8A-D present photographs of STOCKOSORB 500 XL hydrogel particles after 48 days of experiment. The brown particles attached to the hydrogels are coconut residues.
Figure 8B:
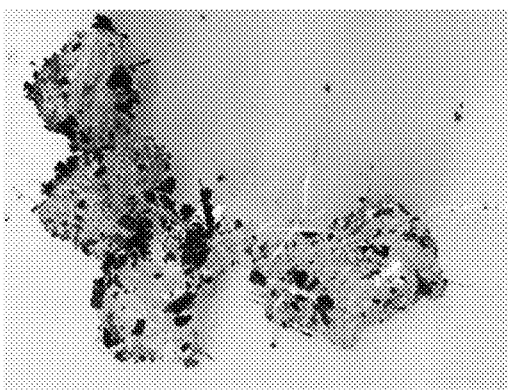
Figure 8C:
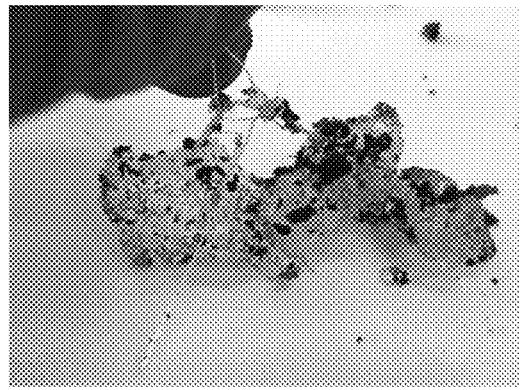
Figure 8D:
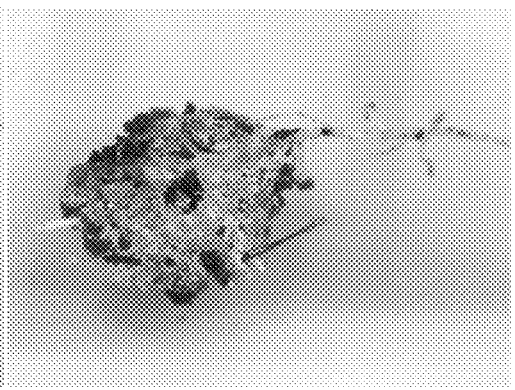
Figure 9:
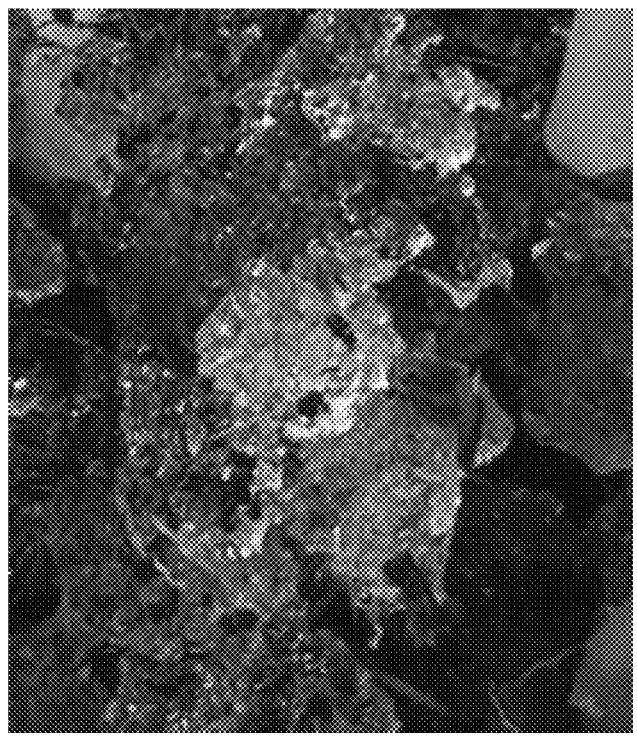
FIG. 9 presents a photograph of STOCKOSORB 660 XL hydrogel particles after 48 days of experiment. The brown particles attached to the hydrogels are coconut residues.

The plants' shoot weight was determined as follows:
For formulation E: 70 grams
For STOCKOSORB 660 XL: 5 grams
For STOCKOSORB 500 XL: 4 grams FIG. 7 presents photographs of shoot system of all tomato plants tested in the three different hydrogels, after 48 days of plant growth. Left—'E' formulation hydrogel, Middle—STOCKOSORB 660 XL, Right—STOCKOSORB 500 XL.

The content inside the container was also evaluated. Root penetration to the hydrogel was observed in the formulation E hydrogel and in the STOCKOSORB 500 XL hydrogel.

Figure 10:
FIG. 10 presents a photograph of Formulation E hydrogel particles after 48 days of experiment. The brown particles attached to the hydrogels are coconut residues. The white substrate is geotextile made of polypropylene.
Figure 11:
FIG. 11 presents a photograph of a tomato plant grown in an exemplary planting kit according to some embodiments of the present invention, with a Formulation E hydrogel.

FIGS. 8A-8D, 9 and 10 present photographs of the root systems upon growing in the STOCKOSORB 500 XL hydrogel (FIGS. 8A-8D), the STOCKOSORB 660 XL hydrogel (FIG. 9) and the Formulation E hydrogel (FIG. 10). As shown therein, good root penetration into the STOCKOSORB 500 XL hydrogel was observed, however, as shown in FIG. 7, the shoot of the plant did not exhibit thriving plant due to insufficient water supply. No root penetration into STOCKOSORB 660 XL hydrogel was observed. Moreover, the shoot of the plant did not exhibit thriving plant due to insufficient water supply. Good root penetration into the 'E' formulation hydrogel was observed along with the plant exhibiting vital plant consisting unripe tomato fruits, as shown in FIG. 11.

Figure 12:
FIG. 12 presents a photograph of a hydrogel formed of a Formulation B 48 days after growing a tomato plant therein after 48 days. The brown particles attached to the hydrogels are coconut residues. The white substrate is geotextile made of polypropylene.

In a second set of experiments, a hydrogel formed of the monomeric solution presented in Table 3 above (Formulation B) was tested under the same conditions. After 48 days, the shoot of the plant exhibited vital plant consisting unripe tomato fruits (not shown) and a very good root penetration to the hydrogel was observed, as shown in FIG. 12.

Example 3

Preparation of Formulation E hydrogel

Materials:

Acrylic Acid (AA)—CAS Number 79-10-7, 99% purity, 200 ppm 4-methoxyphenol (MEHQ) as inhibitor, was obtained from Sigma Aldrich.

Hydroxy ethyl acrylate (HEA), 96% purity, 200-650 ppm monomethyl ether hydroquinone as inhibitor, was obtained from Sigma Aldrich.

N,N-methylene bis acrylamide (MBA), CAS Number: 110-26-9, 96% purity, was obtained for small scale production from Sigma Aldrich, and for large scale production from Zibo Xiney, China.

Tetraethylene Glycol Diacrylate (TTEGDA), CAS Number 17831-71-9, 150-200 ppm MEHQ as inhibitor, was obtained from Sigma Aldrich.

Carboxymethyl cellulose (CMC) Sodium salt Mw=90 kDa, CAS Number 9004-32-4, for small amount obtained from Sigma Aldrich, for large amount obtained from Changshu Wealthy Science and Technology, China.

Sodium persulfate (SPS), CAS Num 7775-27-1, 98% purity, was obtained for small scale production from Sigma Aldrich, for large scale production from Hebei Yatai, China.

Deionized water (DIW).

Sodium hydroxide (NaOH), in a form of pearls, AR grade, CAS Number 1310-73-2, was obtained from Biolab, Israel.

Equipment:

Reactor

Safety latex gloves

Thermal protection gloves

Semi analytical scale locked in a hood

Thermometer pH meter

Polymerization trays—Lock&Lock 2.7 L boxes

Furnace for 85° C.

Quantities: (Materials for Weighing are in Grams)

TABLE 7

| | Size prep | | | | |
|---|---|---|---|---|---|
| | 10 Kg | 25 Kg | 40 Kg | 50 Kg | 1000 kg |
| Water CMC dissolution | 7905.35 | 19763.38 | 31621.4 | 39526.75 | 790535 |
| CMC | 100 | 250 | 400 | 500 | 10000 |
| AA | 750 | 1875 | 3000 | 3750 | 75000 |
| HEA | 250 | 625 | 1000 | 1250 | 25000 |
| NaOH 48% w/w sol | 201.25 | 503.125 | 805 | 1006.25 | 20125 |
| MBA | 12.5 | 31.25 | 50 | 62.5 | 1250.0 |
| TTEGDA | 9.00 | 22.5 | 36.00 | 45.00 | 900.0 |
| SPS | 20 | 50 | 80 | 100 | 2000 |
| Total DI water | 8760 | 21900 | 35040 | 43800 | 876000 |

Preparation of 10 Kg Hydrogel 7905.35 grams DIW was weighed into a first container and 100.0 grams CMC powder (MW 90 kDa) was slowly added to the water until a clear solution was obtained and the CMC was fully dissolved.

750.0 gram DIW was weighed into a second container and 750.0 gram AA was added to the water in a chemical hood and mixed to provide a homogenous 1:1 solution.

The AA solution was added to the CMC solution. 250.0 gram HEA was weighed and added to the obtained solution. 201.25 gram NaOH 48% w/w solution was weighed and added gradually, while maintaining the temperature of the obtained solution at no higher than 25° C. The obtained solution was mixed for at least 30 minutes until clear at room temperature (20-23° C.).

120.5 gram MBA and 9.0 gram TTEGDA were weighed and added to the obtained solution and mixed for at least 30 minutes.

20.0 SPS was weighed and added to the obtained solution. The obtained solution comprising SPS can be stored at 4° C. for up to 48 hours.

A Lock&Lock box of height 8 cm was filled to a height of 4.5 cm with the reaction solution and the box placed in an oven at 85° C. for 2 hours for polymerization to take place, forming the hydrogel.

The box was transferred to a chemical hood, the sides of the box opened, and the hydrogel allowed to cool. The hydrogel was then removed from the box and transferred to a storage bag.

The hydrogel was stored at 18° C. in a ventilated room.

Example 4

Plant Growth Experiments

A hydrogel formed from a monomeric solution as described in Table 5 above was used, and the following commercial hydrogels were used for comparison: STOCKOSORB 500 XL, 660 micro, 660 medium and 660 XL by Evonik®; Seven Color Crystal Boll Crystal Soil; and Hidrokeeper® by Zuchem Ltd. STOCKOSORB 500 XL hydrogel comprises a copolymer of acrylic acid/acryl amide. STOCKOSORB 600 XL comprises a homopolymer of acrylic acid. Hidrokeeper® comprises a copolymer of acrylamide and potassium acrylate The hydrogels contained tap water.

Cherry tomato plants of the Zahara strain were planted in 1.5 liter pots, each containing one of the above hydrogels prepared according to manufacturer's instructions, together with the hydroponic fertilizer solution Or from Gat Fertilizers Ltd. at a concentration of 1 ml/L. In addition, 3 g of granular potassium nitrate and 1 g of granular fertilizer ME+14-4-28 (potassium nitrate enriched with micronutrients) from Haifa Chemicals was added to each pot. Plants were provided in triplicate for each hydrogel tested. The plants were grown indoors on growing tables at room temperature with average humidity of 50-60%, under photosynthetic lighting for a period of 30 days.

Plant indices (height and leaf length) were measured and the pot was weighed to monitor water evaporation.

Figure 13:
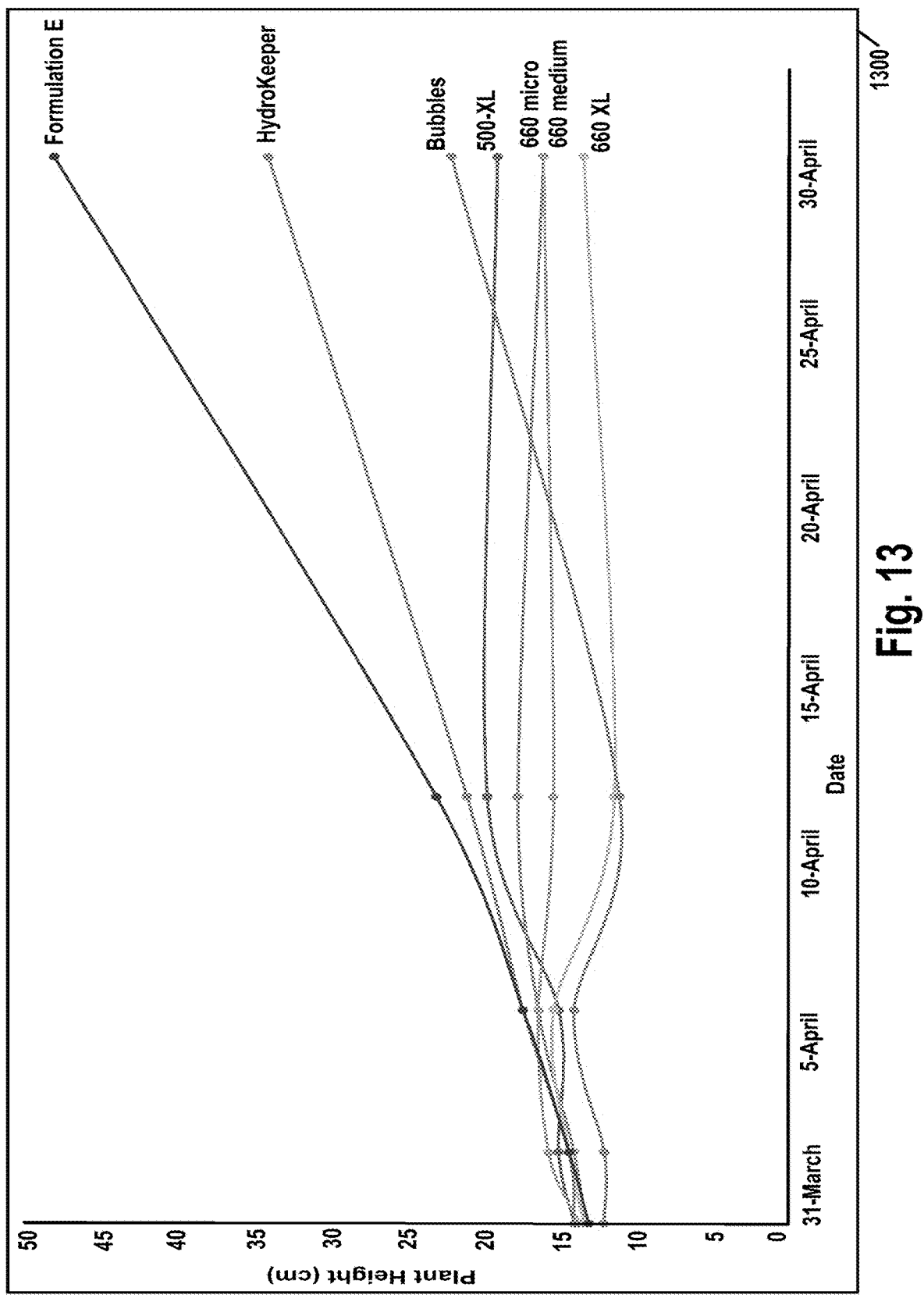
FIG. 13 is a chart demonstrating the height of plants that were grown using a Formulation E hydrogel, compared to conventional hydrogels, on various days over a 30-day test period.

FIG. 13 is a chart 1300 demonstrating the height of plants that were grown using a Formulation E hydrogel, compared to conventional hydrogels, on various days during a 30-day test period. The vertical axis represents the height of the plant, in centimeters. The horizontal axis represents the date, from March 31st to April 30th. As demonstrated, the plant height on each day invention, compared to the height of plants grown using conventional hydrogels.

Figure 14:
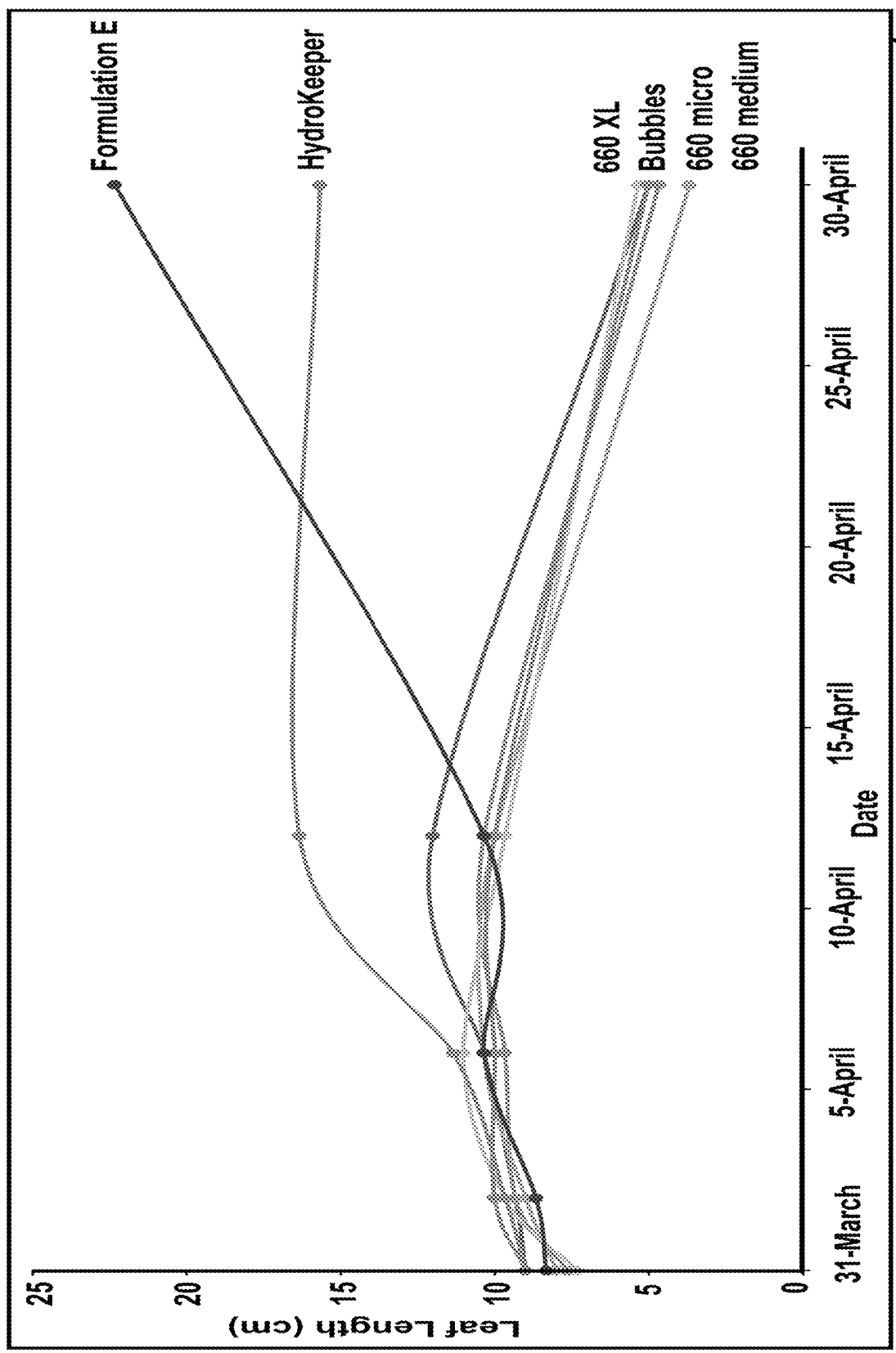
FIG. 14 is a chart demonstrating the leaf length of plants that were grown using a Formulation E hydrogel, compared to conventional hydrogels, on various days over a 30-day test period.

FIG. 14 is a chart 1400 demonstrating the leaf length of plants that were grown using a Formulation E hydrogel, compared to conventional hydrogels, on various days during a 30-day test period. As shown, the leaf length after 30 days is significantly greater for plants grown using the Formulation E hydrogel of the present invention, compared to those of plants grown using conventional hydrogels.

Figure 15:
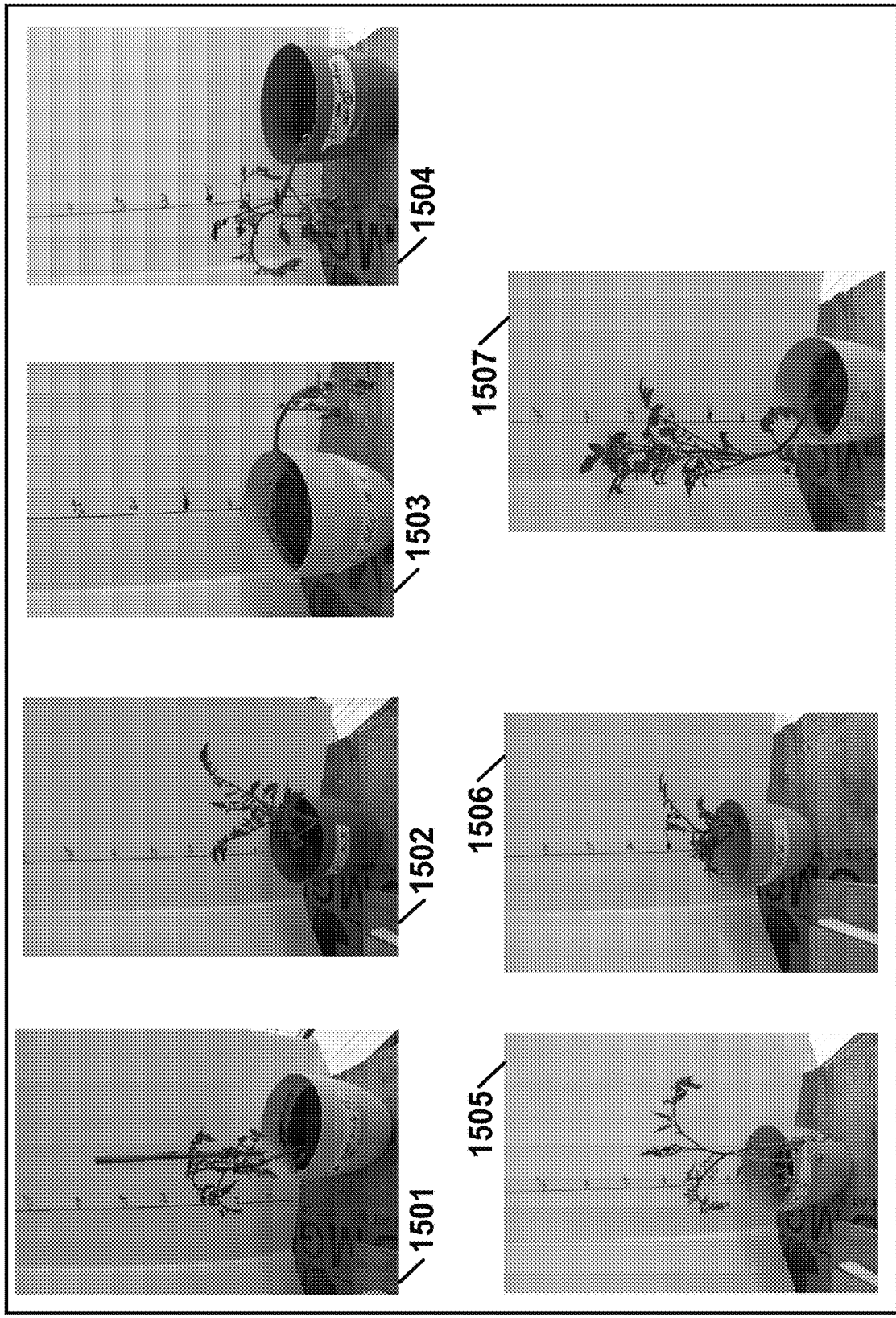
FIG. 15 is a set of photographs of cherry tomato plants, that were grown using conventional hydrogels compared to a formulation E hydrogel of the present invention, after 19 days.

FIG. 15 is a set 1500 of photographs of cherry tomato plants, that were grown using conventional hydrogels compared to a formulation E hydrogel of the present invention, after 19 days. The set 1500 demonstrates plants that were grown using: STOCKOSORB 660 micro (1501), STOCKOSORB 500 XL (1502), STOCKOSORB 660 XL (1503), STOCKOSORB 660 medium (1504), HidroKeeper® (1505), Seven Color Crystal Boll (1506), and Formulation E hydrogel of the present invention (1507). As shown, a plant of greater height and longer leaf length was obtained over the same period of time, using the Formulation E hydrogel of the present invention, compared to plants grown using conventional hydrogels.

Figure 16:
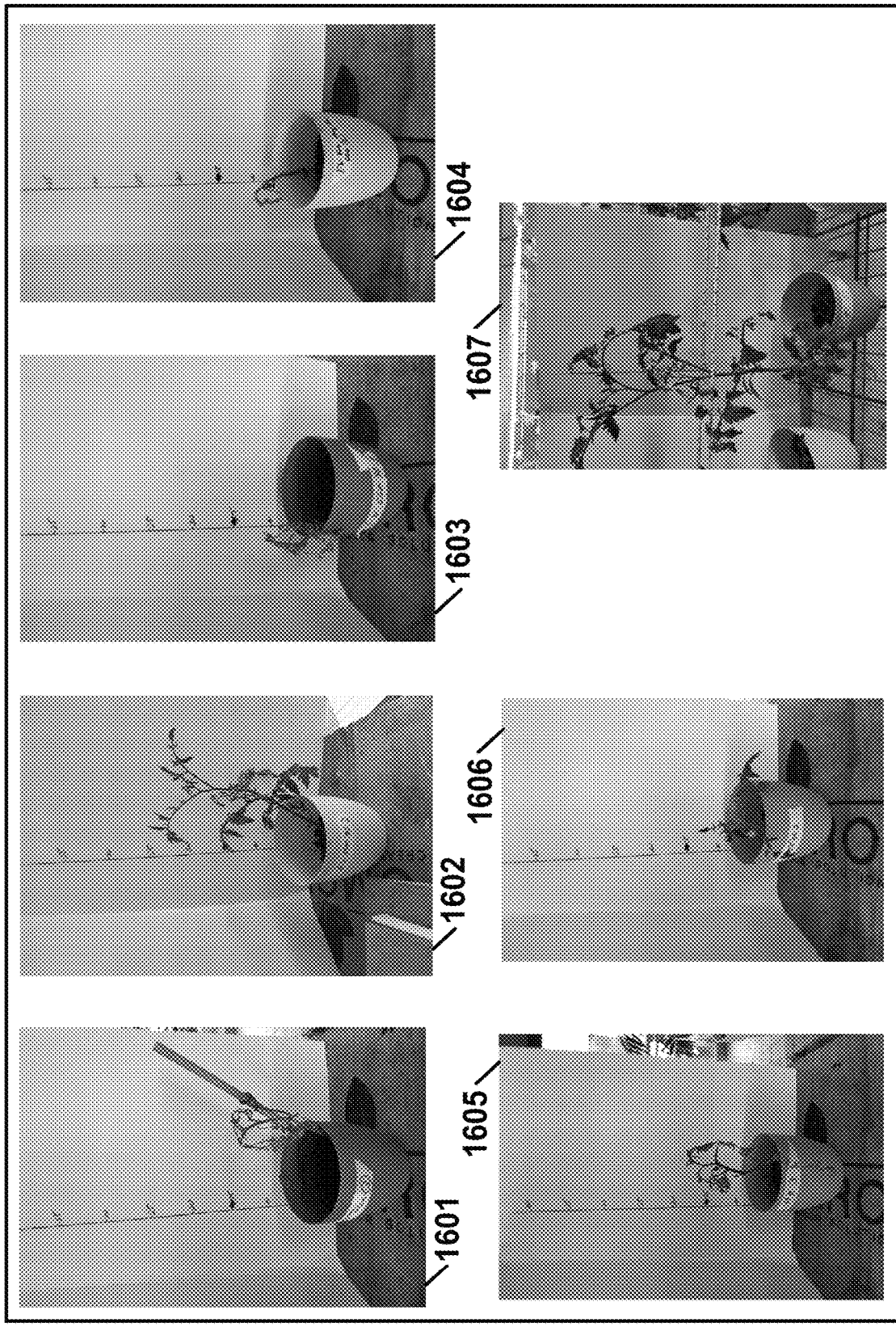
FIG. 16 is a set of photographs of cherry tomato plants, that were grown using conventional hydrogels compared to a formulation E hydrogel of the present invention, after 30 days.

FIG. 16 is a set 1600 of photographs of cherry tomato plants, that were grown using conventional hydrogels compared to a formulation E hydrogel of the present invention, after 30 days. The set 1600 demonstrates plants that were grown using: STOCKOSORB 660 micro (1601), STOCKOSORB 500 XL (1602), STOCKOSORB 660 XL (1603), STOCKOSORB 660 medium (1604), HidroKeeper® (1605), Seven Color Crystal Boll (1606), and Formulation E hydrogel of the present invention (1607). As shown, a plant of greater height and longer leaf length was obtained over the same period of time, using the Formulation E hydrogel of the present invention, compared to plants grown using conventional hydrogels.

The results show that the tomato plants were unable to acclimatize to any of the conventional hydrogels except for Hidrokeeper® and withered within a short time (less than 19 days). The plants were able to acclimatize to the Hidrokeeper® hydrogel for the first 2 weeks of the test period, but then became unhealthy and showed a regression of growth, possibly as a result of an excessive rate of evaporation of water from the hydrogel. This resulted in a significant decrease in growth rate and even to death of the plant.

In clear contrast, as shown in the figures, the plants acclimatized and thrived in Formulation E hydrogel, showing excellent growth for the entire test period. The plants grown in Formulation E hydrogel were taller and had longer leaves than those grown in commercial hydrogels, properties which are considered to be indicators of the condition of a plant. The plants grown in Formulation E hydrogel blossomed and produced fruit.

It is therefore shown that unlike the commercial hydrogels, the hydrogels of the present invention are able to serve as a sole substrate for growth of plants over an extended time period.

Example 5

Preparation of Further Exemplary Acrylic Acid-Based Hydrogels

Using the procedure described in Example 1 above, additional hydrogels were prepared from the monomeric solutions (e.g., 10 Kg solutions) presented in Table 8 below, in which amounts are weight percentages.

TABLE 8

| Gel Formulation | AA | HEA | MBA | TTEGDA | CMC 90 kDa | SPS | NaOH |
|---|---|---|---|---|---|---|---|
| G | 9.75 | 2.44 | 0.120 | 0.090 | 1 | 0.2 | 0.94 |
| H | 7.22 | 2.90 | 0.125 | 0.090 | 1 | 0.2 | 0.96 |
| I | 7.40 | 2.47 | 0.124 | 0.090 | 2 | 0.2 | 0.95 |
| J | 11.25 | 3.75 | 0.118 | 0.085 | 1 | 0.2 | 0.91 |
| K | 7.85 | 1.96 | 0.123 | 0.092 | 1 | 0.2 | 0.97 |
| L | 9.86 | 3.07 | 0.121 | 0.087 | 1 | 0.2 | 0.93 |
| M | 7.49 | 2.50 | 0.156 | 0.112 | 1 | 0.2 | 0.96 |
| N | 11.25 | 3.75 | | 0.316 | 1 | 0.2 | 0.91 |

Example 6

Preparation of Exemplary Acrylic Acid-Based Hydrogels Comprising KOH as Acid Neutralizer Using a procedure based on that described in Example 1 above, in which NaOH was replaced by KOH, additional hydrogels were prepared from the monomeric solutions presented in Table 9 below, in which amounts are weight percentages.

TABLE 9

| Gel formulation | AA | HEA | MBA | TTEGDA | CMC 90 kDa | SPS | KOH | NaOH |
|---|---|---|---|---|---|---|---|---|
| O | 7.5 | 2.5 | 0.12 | 0.09 | 1.0 | 0.2 | 1.4 | 1.0 |
| P | 7.5 | 2.5 | 0.12 | 0.09 | 1.0 | 0.2 | 1.3 | |
| Q | 7.5 | 2.5 | 0.12 | 0.09 | 1.0 | 0.2 | 0.7 | 0.5 |
| R | 5.0 | 2.5 | 0.12 | 0.09 | 1.0 | 0.2 | 1.3 | |
| S | 7.4 | 2.5 | 0.12 | 0.09 | 1.0 | 0.2 | 2.9 | |
| T | 7.4 | 2.5 | 0.12 | 0.08 | 2.0 | 0.2 | 1.3 | |

Example 7

Preparation of Exemplary Acrylic Acid-Based Hydrogels Comprising Different Grades of CMC Using the procedure based on that described in Example 1 above, in which the 90 kDa CMC used in formulations B to F was replaced by 250 kDa CMC, additional hydrogels were prepared from the monomeric solutions presented in Table 10 below, in which amounts are weight percentages.

TABLE 10

| Gel formulation | AA | HEA | MBA | TTEGDA | CMC 250 kDa | SPS | NaOH |
|---|---|---|---|---|---|---|---|
| U | 7.5 | 2.5 | 0.1 | 0.1 | 1.0 | 0.2 | 1.0 |
| V | 9.7 | 2.4 | 0.1 | 0.1 | 1.0 | 0.2 | 0.9 |
| W | 9.3 | 3.1 | 0.1 | 0.1 | 1.0 | 0.2 | 0.9 |
| X | 9.8 | 2.4 | 0.2 | | 1.0 | 0.2 | 0.9 |
| Y | 9.7 | 2.4 | | 0.3 | 1.0 | 0.2 | 0.9 |
| Z | 9.7 | 2.4 | 0.2 | 0.1 | 1.0 | 0.2 | 0.9 |
| AA | 11.3 | 3.8 | 0.1 | 0.1 | 0.9 | 0.2 | 0.9 |
| BB | 17.7 | 5.9 | 0.1 | 0.1 | 0.9 | 0.2 | 0.9 |
| CC | 17.7 | 5.9 | 0.3 | 0.2 | 0.9 | 0.2 | 0.9 |
| DD | 17.7 | 5.9 | | 0.8 | 0.9 | 0.2 | 0.9 |

Example 8

Preparation of Exemplary Acrylic Acid-Based Hydrogels Comprising Different Crosslinkers Using a procedure based on that described in Example 1 above, in which different crosslinkers were used instead of MBA and TTEGDA, additional hydrogels were prepared from the monomeric solutions presented in Table 11, below, in which amounts are weight percentages.

TABLE 11

| Gel | AA | HEA | CMC 90 kDa | CMC 250 kDa | SPS | NaOH | TGDA | PEGDA | TMPETA | PET | PETT |
|---|---|---|---|---|---|---|---|---|---|---|---|
| EE | 7.5 | 2.5 | 1.0 | | 0.2 | 1.0 | | | | 0.2 | |
| FF | 10.0 | 2.5 | | 1.0 | 0.2 | 1.0 | | | | 0.2 | |
| GG | 7.5 | 2.5 | 1.0 | | 0.2 | 1.0 | | | | | 0.2 |
| HH | 9.7 | 2.4 | | 1.0 | 0.2 | 0.9 | | | | | 0.2 |
| II | 11.3 | 3.8 | 0.9 | | 0.2 | 0.9 | 0.4 | | | | |
| JJ | 11.3 | 3.8 | 0.9 | | 0.2 | 0.9 | | 0.7 | | | |
| KK | 11.3 | 3.8 | 0.9 | | 0.2 | 0.9 | | | 0.6 | | |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A hydrogel comprising a cross-linked polymer comprising polyacrylic acid and hydroxy ethyl acrylate (HEA) at a weight ratio of 2:1-4:1 polyacrylic acid to HEA, wherein the hydrogel comprises cross-links formed from residues of N,N-methylene bis acrylamide (MBA) and tetraethylene glycol diacrylate (TTEGDA).

2. The hydrogel of claim 1, wherein a ratio of said MBA to said TTEGDA is in the range of from about 10:1 to about 1:10.

3. The hydrogel of claim 1, further comprising a non-crosslinked additive.

4. The hydrogel of claim 3, wherein said non-crosslinked additive is a macromolecule selected from the group consisting of: polycaprolactone, polyvinylalcohol (PVA), polysaccharides, and combinations thereof.

5. The hydrogel of claim 4, wherein said polysaccharide is selected from the group consisting of: dextran, alginate, agarose, chitosan, hyaluronic acid, starch, hydroxypropyl cellulose (HPC), carboxymethyl cellulose (CMC), k-carrageenan, i-carrageenan, and combinations thereof.

6. The hydrogel of claim 3, wherein said non-crosslinked additive is selected from the group consisting of: PVA, CMC, and combinations thereof.

7. The hydrogel of claim 4, wherein said polysaccharide is selected from the group consisting of: alginate methacrylate, sodium salt of alginic acid, glycol chitosan methacrylate, hyaluronic acid methacrylate, glycol chitosan methacrylate, and combinations thereof.

8. The hydrogel of claim 1, wherein said cross-linked polymer further comprises an acid neutralizer comprising NaOH.

9. The hydrogel of claim 1, further comprising a polymerization initiator.

10. The hydrogel of claim 9, wherein said polymerization initiator is sodium persulfate (SPS).

11. The hydrogel of claim 1, comprising polyacrylic acid, a mixture of MBA and TTEGDA, NaOH, HEA, CMC and SPS.

12. The hydrogel of claim 1, having a degree of cross-linking in the range of from 0.4 to 4.

13. The hydrogel of claim 1, further comprising an acid neutralizer comprising KOH.

14. The hydrogel of claim 6, wherein said non-crosslinked additive comprises CMC having a molecular weight in the range of from 90 kDa to 1,000 kDa.

15. The hydrogel of claim 9, wherein said polymerization initiator comprises alight initiator, optionally selected from the group consisting of 2,2-Dimethoxy-2-phenylacetophenone, lithium phenyl-2,4,6-trimethylbenzoylphosphinate, Igracure® photoinitiators, and combinations thereof.

16. A method for the preparation of a hydrogel, comprising:
(a) combining the following components in water to provide an aqueous hydrogel precursor solution: (i) carboxymethyl cellulose (CMC), (ii) acrylic acid, (iii) hydroxy ethyl acrylate (HEA), (iv) NaOH, (v) N,N-methylene bis acrylamide (MBA) and tetraethylene glycol diacrylate (TTEGDA), and (vi) sodium persulfate (SPS), wherein the acrylic acid and HEA are at a weight ratio of 2:1-4:1 acrylic acid to HEA; and
(b) heating said hydrogel precursor solution whereby polymerization and crosslinking of said acrylic acid occurs to provide said hydrogel.

17. The method of claim 16, comprising:
(a) providing said CMC as a first aqueous solution;
(b) providing said acrylic acid as a second aqueous solution;
(c) mixing said first aqueous solution and said second aqueous solution to form a third aqueous solution; and
(d) adding the following components to said third aqueous solution to provide said hydrogel precursor solution: (I) HEA, (II) NaOH, (III) MBA and TTEGDA, (IV) SPS.

18. A method for growing a plant, comprising:
(a) providing a hydrogel as a growth medium for said plant, wherein the hydrogel comprises a cross-linked polymer comprising polyacrylic acid and hydroxy ethyl acrylate (HEA) at a weight ratio of 2:1-4:1 polyacrylic acid to HEA, and the hydrogel comprises cross-links formed from residues of N,N-methylene bis acrylamide (MBA) and tetraethylene glycol diacrylate (TTEGDA);
(b) placing said plant in said growth medium in the absence of soil; and
(c) allowing said plant to grow in said growth medium in the absence of soil.

* * * * *